(12) United States Patent
Miki

(10) Patent No.: US 6,327,480 B1
(45) Date of Patent: Dec. 4, 2001

(54) TELECOMMUNICATION METHOD PERMITTING EFFICIENT DATA COMMUNICATION

(75) Inventor: Shigeichirou Miki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/782,109

(22) Filed: Jan. 13, 1997

(30) Foreign Application Priority Data

Jan. 17, 1996 (JP) ................................................ 8-005939

(51) Int. Cl.[7] .................................................... H04Q 7/00
(52) U.S. Cl. ............................ 455/500; 455/517; 370/473
(58) Field of Search .................................. 455/517, 501, 455/507, 526, 500, 66, 503, 412; 370/473, 474, 394; 375/260, 299

(56) References Cited

U.S. PATENT DOCUMENTS

| | | | |
|---|---|---|---|
| 3,879,577 | * | 4/1975 | Progler ................................ 178/23 |
| 3,979,719 | * | 9/1976 | Tooley et al. ........................ 340/146 |
| 4,507,778 | * | 3/1985 | Tan ...................................... 370/94 |
| 4,644,351 | * | 2/1987 | Zabarsky et al. ............... 340/825.44 |
| 4,972,473 | * | 11/1990 | Ejiri et al. ............................ 380/20 |
| 5,220,562 | * | 6/1993 | Takada et al. ..................... 370/85.13 |
| 5,274,836 | * | 12/1993 | Lux ..................................... 455/49.1 |
| 5,473,609 | | 12/1995 | Chaney . |
| 5,590,403 | * | 12/1996 | Cameron et al. ..................... 455/503 |
| 5,619,361 | * | 4/1997 | Sagesaka et al. .................... 455/517 |
| 5,649,294 | * | 7/1997 | Ayerst et al. ........................ 455/517 |
| 5,701,329 | * | 12/1997 | Croft et al. .......................... 375/224 |

FOREIGN PATENT DOCUMENTS

| | | | |
|---|---|---|---|
| 3513181 A1 | | 10/1986 | (DE) . |
| 785653 | * | 7/1997 | (EP) ............................. H04L/12/56 |
| 3-179944 | | 8/1991 | (JP) . |
| 06-338863 | | 12/1994 | (JP) . |
| 09-027805 | | 1/1997 | (JP) . |

* cited by examiner

*Primary Examiner*—William G. Trost
*Assistant Examiner*—Tilahun Gesesse
(74) *Attorney, Agent, or Firm*—Nixon & Vanderhye PC

(57) ABSTRACT

Transmission data is previously divided into a plurality of data blocks. If data is updated, the update data of the version is transmitted. The receiving side receives and stores data from the start of a block. If there is the update data of the version, the reception memory is cleared and reception is started once again. Thus, all the blocks are received, and rearranged to receive prescribed data. As a result, in a telecommunication device repeatedly transmitting the same information, an easy to use telecommunication method can be provided.

27 Claims, 29 Drawing Sheets

> IT WAS RAINY YESTERDAY, DECEMBER ,19. IT WILL BE CLOUDY AT FIRST, RAINY LATER TODAY. IT WILL BE CLEAR TOMORROW, DECEMBER ,19. IT WILL BE CLEAR THE DAY AFTER TOMORROW. THERE WILL BE OCCASIONAL RAIN IN THE LATTER HALF OF THE WEEK. IT CONTINUES TO BE HOT FOR A MONTH.

(B) DIVIDED INTO BLOCKS

Ver.1
BLOCK 1　IT WAS RAINY YESTERDAY, DECEMBER ,19.
BLOCK 2　IT WILL BE CLOUDY AT FIRST, RAINY LATER TODAY.
BLOCK 3　IT WILL BE CLEAR TOMORROW, DECEMBER ,19.
BLOCK 4　IT WILL BE CLEAR THE DAY AFTER TOMORROW.
BLOCK 5　THERE WILL BE OCCASIONAL RAIN IN THE LATTER HALF OF THE WEEK.
BLOCK 6　IT CONTINUES TO BE HOT FOR A MONTH.

(C) UPDATED　　　　BLOCK 4 CLEAR→RAINY

Ver.2
BLOCK 1　IT WAS RAINY YESTERDAY, DECEMBER ,19.
BLOCK 2　IT WILL BE CLOUDY AT FIRST, RAINY LATER TODAY.
BLOCK 3　IT WILL BE CLEAR TOMORROW, DECEMBER ,19.
BLOCK 4　IT WILL BE RAINY THE DAY AFTER TOMORROW.
BLOCK 5　THERE WILL BE OCCASIONAL RAIN IN THE LATTER HALF OF THE WEEK.
BLOCK 6　IT CONTINUES TO BE HOT FOR A MONTH.

FIG.5
(A)
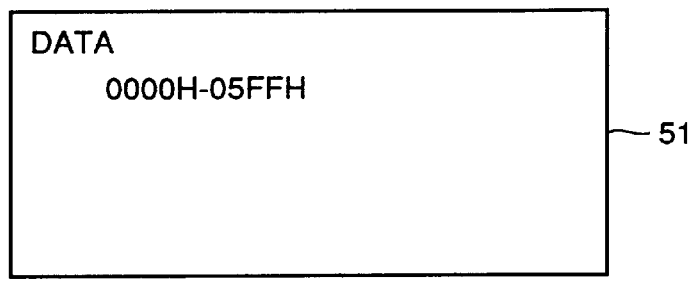
DATA
  0000H-05FFH
— 51
(B) DIVIDED INTO BLOCKS
BLOCK1
| ADDRESS 0000H | ver.1 | DATA 0000H-01FFH |
BLOCK2
| ADDRESS 0200H | ver.1 | DATA 0200H-03FFH |
BLOCK3
| ADDRESS 0400H | ver.1 | DATA 0400H-05FFH |
(C) UPDATED
BLOCK1
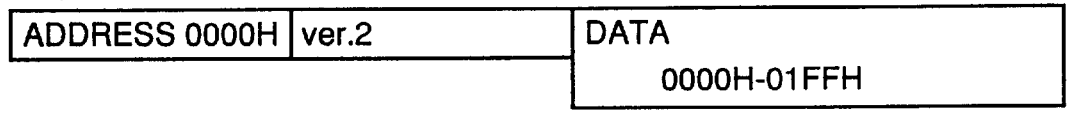
| ADDRESS 0000H | ver.2 | DATA 0000H-01FFH |
BLOCK2
| ADDRESS 0200H | ver.2 | DATA 0200H-03FFH |
BLOCK3
| ADDRESS 0000H | ver.2 | DATA 0400H-05FFH |

FIG.8
(A)
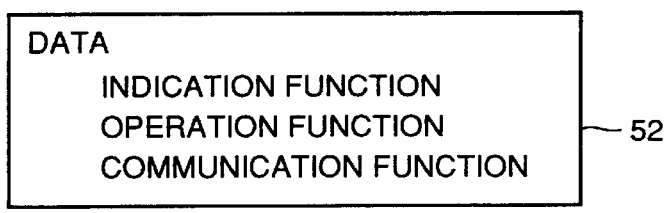
(B) DIVIDED INTO BLOCKS
BLOCK1
BLOCK2
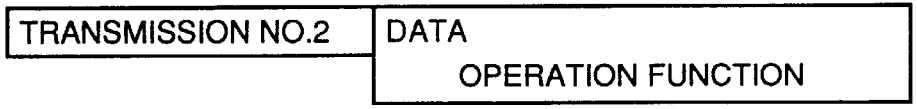
BLOCK3
(C) DATA UPDATED   CONTENT OF CHANGE
INDICATION FUNCTION UPDATED
OPERATION FUNCTION UPDATED
INDICATION FUNCTION, COMMUNICATION FUNCTION BOTH BEFORE AND AFTER UPDATING CAN BE USED
OPERATION FUNCTION CANNOT BE USED WITH ONE BEFORE UPDATING
BLOCK1
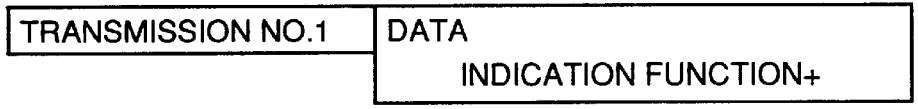
BLOCK2
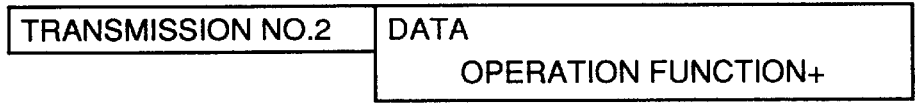
BLOCK3

FIG.14
(A)
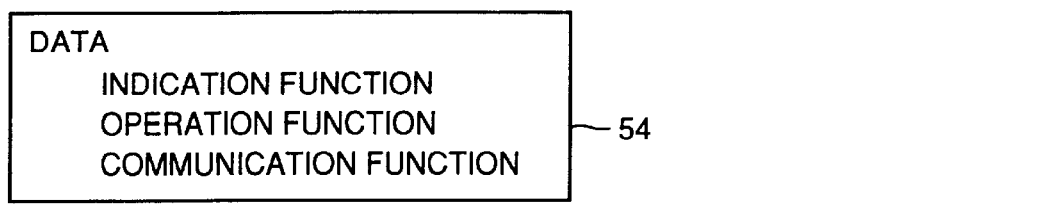
(B) DIVIDED INTO BLOCKS
BLOCK1
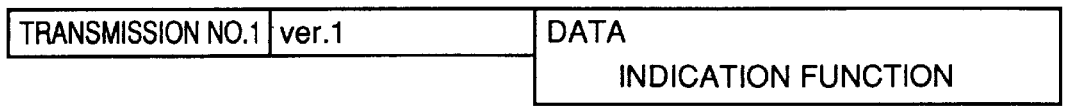
BLOCK2
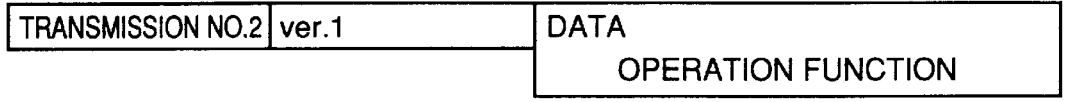
BLOCK3
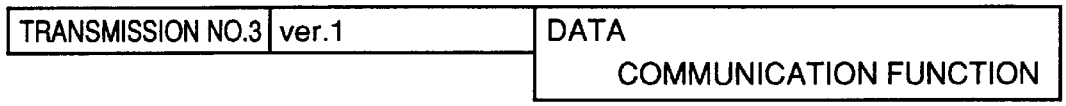
(C) DATA UPDATED
CONTENT OF CHANGE
INDICATION FUNCTION UPDATED
OPERATION FUNCTION UPDATED
INDICATION FUNCTION,COMMUNICATION FUNCTION BOTH BEFORE AND AFTER UPDATING CAN BE USED
OPERATION FUNCTION CANNOT BE USED WITH ONE BEFORE UPDATING
BLOCK1
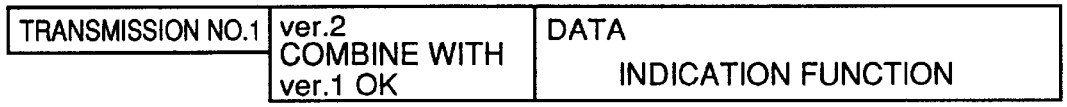
BLOCK2
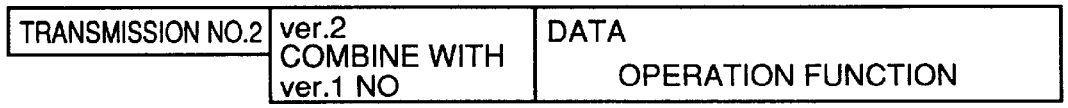
BLOCK3
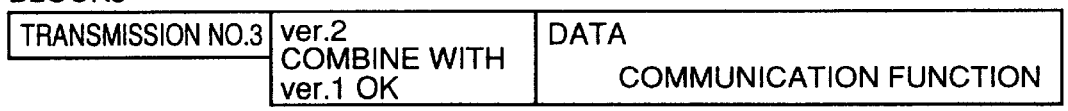

FIG.28A

| COMMUNICATION 1 CONTENT | DATA 1<br>DATA 2<br>DATA 3<br>INDICATION F. |
|---|---|
| COMMUNICATION 2 CONTENT | DATA 4<br>DATA 5<br>DATA 6<br>OPERATION F. |
| COMMUNICATION 1 NECESSART CONTENT ORDER | DATA 1<br>DATA 2<br>DATA 3<br>INDICATION F.<br>OPERATION F.<br>　(SEE COMMUNICATION 2) |

FIG.28B

| COMMUNICATION 2 CONTENT | DATA 4<br>DATA 5<br>DATA 6<br>OPERATION F. |
|---|---|
| COMMUNICATION 1 CONTENT | DATA 1<br>DATA 2<br>DATA 3<br>INDICATION F. |
| COMMUNICATION 2 NECESSART CONTENT ORDER | DATA 4<br>DATA 5<br>DATA 6<br>INDICATION F.<br>　(SEE COMMUNICATION 1)<br>OPERATION F. |

FIG.29A
PRIOR ART
FIG.29B
PRIOR ART
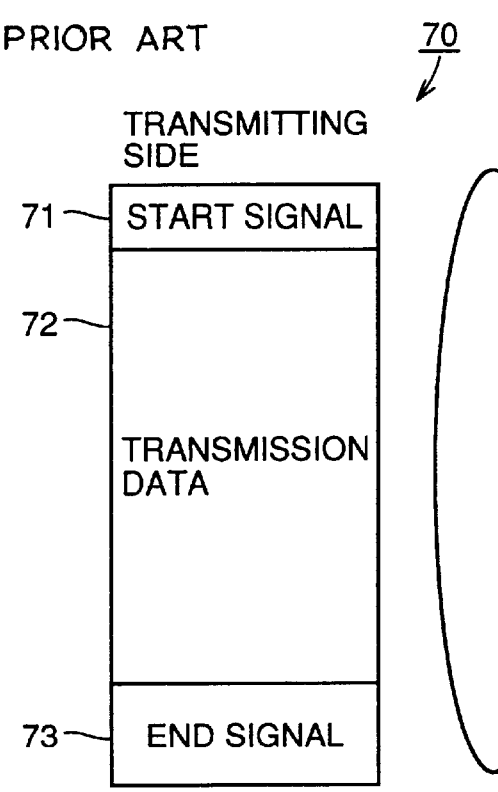
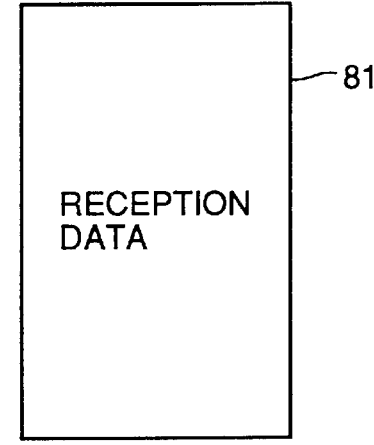

TELECOMMUNICATION METHOD PERMITTING EFFICIENT DATA COMMUNICATION

BACKGROUND OF THE INVENTION

1. Field of the Invention

The present invention relates generally to telecommunication methods for transmitting long information based on a comparison of transmission speeds to a plurality of receiving ends through networks or radiowaves, and for unilateral communication, and more particularly, to a telecommunication method permitting reduction of waiting time until transmission of data is started and efficient data communication.

2. Description of the Related Art

A telecommunication method of interest to the present invention is disclosed for example by Japanese Patent Laying Open No. 3-179944. FIGS. 29A and 29B illustrate the concept of a conventional repetitive data transmission as described in the document. The transmitting side (FIG. 29*a*) repeatedly transmits a start signal, transmission data, and an end signal, while the data receiving side (FIG. 29*b*) either receives data from the middle or waits for the start signal to start receiving the data upon accessing the transmission data. If the receiving side starts receiving data from the middle, the received data is stored in a memory, and the stored data is moved based on the information associated with the end signal and the start signal.

According to a conventional telecommunication method, if data is received from the middle, the necessary amount of memory capacity until the start or end signal is received is unknown, which makes it difficult to manage the memory. In the case of waiting for the start signal of data, the receiving side must wait for a long period of time until such start of data is received for lengthy data. Meanwhile, in the case of receiving data from the middle, if the content of data is updated and changed, the updated data must be received from the beginning, invalidating the already received data. Furthermore, the newest data upon accessing is not available, and the transmitting side cannot update the old until the transmission of the data completes. If there are provided a plurality of communication means, information may overlap between the plurality of communication means, which precludes efficient data communication.

SUMMARY OF THE INVENTION

It is therefore an object of the invention to provide an easy-to-use telecommunication method, in a telecommunication method of repeatedly transmitting the same information.

Another object of the invention is to alleviate management of a memory or the like when information is received from the middle of data.

Yet another object of the invention is to permit data to be updated during transmission.

Still another object of the invention is to permit utilization of data before updated if it can be used as is.

An additional object of the invention is to achieve communication less affected by communication time by utilizing information received before or after updating if data is updated on the transmission side.

Another additional object of the invention is to reduce time required for data communication if there are a plurality of communication means.

A telecommunication method by which the same information is repeatedly transmitted from a single information source to other information devices according to the present invention includes the steps of dividing the entire information into a plurality of data blocks on the transmitting side, transmissing the data blocks in a predetermined procedure, starting receiving an arbitrary data block among the transmitted data blocks, and obtaining the entire information when there is no longer any unreceived data block.

In a telecommunication method by which the same information is repeatedly transmitted, the entire information is divided into a plurality of data blocks and transmitted in a predetermined procedure, information is received from data blocks on the receiving side, then the entire information is obtained when there is no longer any unreceived data block, and therefore waiting time until the start of receiving data will be equal to only time required for transferring one data block. The memory can be managed on a block-basis. As a result, in a telecommunication method by which the same information is repeatedly transmitted, an easy to use telecommunication method can be provided.

The telecommunication method preferably includes a step of specifying data blocks. Since a plurality of data blocks produced by dividing are specified, it will be easier to know the order of restoring the plurality of data blocks on the receiving side.

The step of specifying data blocks more preferably includes a step of identifying information representing the position of storing a data block received on the receiving side, information representing the order of transmitting data blocks and data blocks, and the receiving side can manage and restore the received information based on these pieces of information.

In a telecommunication method according to another aspect of the invention, the positions of transmission blocks are shifted for transmission, using a plurality of transmission media. The receiving side receives information simultaneously from the plurality of transmission media, only portions with no overlapped content are gathered. Different parts of data can be simultaneously received at a plurality of receivers, and therefore time required for communication can be reduced by combining the data.

Preferably, if there is an overlapped portion between the contents on the transmitting sides, at least one of the transmitters eliminates the overlapped information, and the information on the elimination is transmitted to the receiving side. The receiving side receives and restores desired information based on information from the plurality of transmitters as well as the elimination information.

If part of information is eliminated, the receiving side refers to information from another transmitter based on the information on the elimination. Thus, desired communication information can be obtained for a shorter time period without increasing repetition time by individual transmitters.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 illustrates the content of each block if one document is divided into a plurality of data blocks for transmission;

FIG. 5 illustrates transmission data divided lengthwise;

FIG. 8 shows an example of functionally divided data;

FIG. 14 shows an example of functionally divided data;

FIGS. 28A and 28B show contents of outlines A and B according to the twelfth embodiment; and FIGS. 29A and 29B show a conventional telecommunication method.

DESCRIPTION OF THE PREFERRED EMBODIMENTS

First Embodiment

An embodiment of the invention will be described in conjunction with the accompanying drawings.

Figure 1:
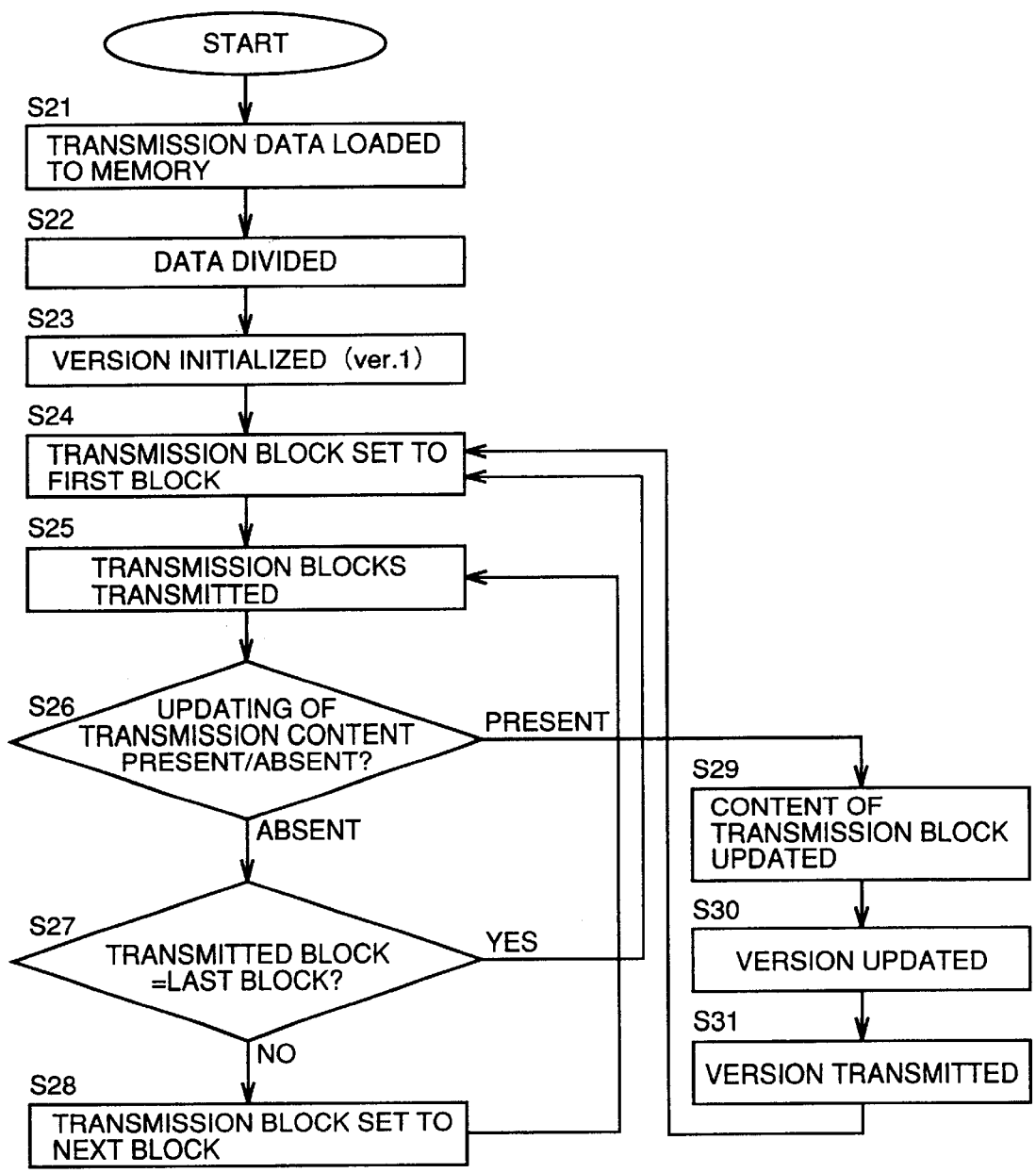
FIG. 1 is a flow chart for use in illustration of a procedure of transmission according to a first embodiment of the invention.

FIG. 1 is a flow chart showing a procedure on the transmitting side step by step in a telecommunication method according to a first embodiment of the invention. Referring to FIG. 1, in step S21 (hereinafter "step" is omitted), transmission data is prepared and the data is divided in S22. The data is divided lengthwise, on a line-basis for a document, on a subroutine basis for a program, or on a function-basis for an application. In the case of producing one data block divided from a document will be described by way of illustration in conjunction with FIG. 2. In FIG. 2, (A) is an original document, (B) is the document divided into block, and (C) shows the state in which the document thus divided into blocks is updated. As shown in FIG. 2, the original document (A) formed of a plurality of sentences are divided into blocks on a sentence-basis (B), among which block 4 is updated from "CLEAR" to "RAINY" (C).

In S24, a data block to be transmitted (transmission block) is set to the initial portion of data divided in S22 (which corresponds to block 1 in FIG. 2). In S25, transmission blocks set in S24 and S28 which will be described later are transmitted to the receiving side. It is confirmed if there is no updating of transmission data in S26, and the processing moves to S29 if there is any updating, and to S27 otherwise. In S27, it is determined if the data transmitted in S25 is the last block of the data divided in S22 (which corresponds to block 6 in FIG. 2). If it is the last block, the operation moves to S24 to transmit the data from the beginning, and to S28 otherwise. In S28, data to be transmitted in S25 is set to the next block, and operation moves to S25. The processings in and after S29 are executed if it is determined in S26 that the data is updated, the content of the transmission block of interest is updated in S29, and then the operation proceeds to S30. In S30, the version is updated (ver. 1→ver. 2 in FIG. 2), a version update signal is transmitted to indicate the updating of the version, and the processing proceeds to S20 to transmit the data from the first block.

Note that the last block is determined by detecting a signal inserted within the transmission data and indicating the last block or the first block. Since data such as CHECK SUM, ID is usually attached to data blocks produced by dividing, a flag indicating the last or first block may be additionally attached to such data and detected. The version update signal is similarly detected.

Figure 3:
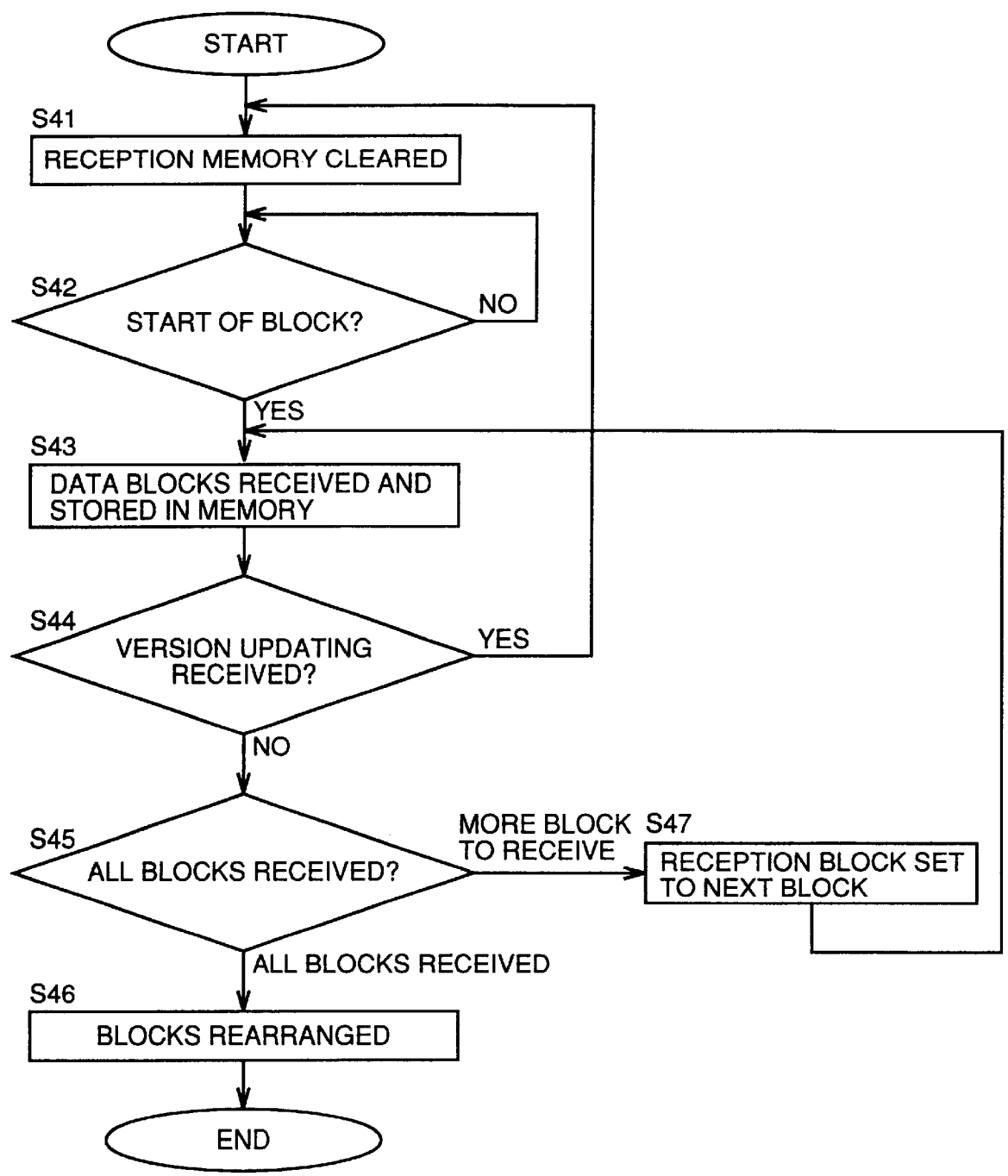
FIG. 3 is a flow chart for use in illustration of a procedure of reception according to the first embodiment.

Now, the processings on the receiving side will be described in conjunction with a flow chart in FIG. 3. In S41, the reception memory is cleared, thus initializing the reception state. In S42, the start of block is waited for, and the processing proceeds to S43 if the start of the block is confirmed. In S43, data blocks transmitted from the transmission side (S25) are received, and in S44, based on the presence/absence of version information transmitting from transmitting side (S31) the presence/absence of the updating of data is determined. If there is such an updating, the processing proceeds to S41, reception is started all over again, and if there is no such updating, the processing proceeds to S45. If there is the updating, reception is restarted in S41, the procedure of updating the received data is not necessary. In S45, it is determined if all the blocks are received, and the processing proceeds to S46 if all the blocks are received, and to S47 otherwise. In S47, the reception block is set to the next block, which is received in S43. In S46, the received data blocks are rearranged. This rearranging may be conducted with reference to the position of the first block, and memory management during the rearrangement may be executed on a block-basis.

Second Embodiment

Figure 4:
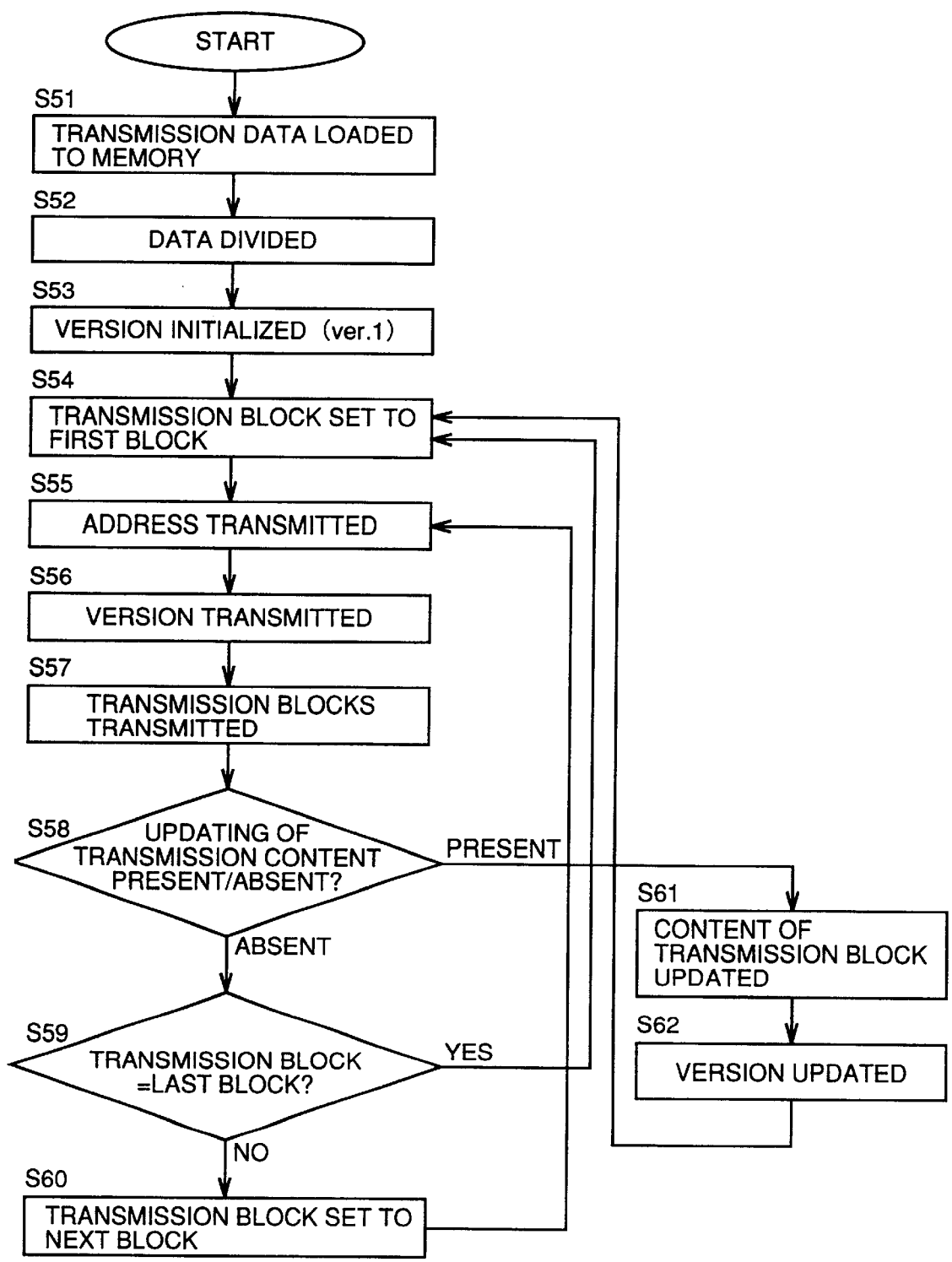
FIG. 4 is a flow chart for use in illustration of transmission according to a second embodiment.

Now, a second embodiment of the invention will be described. FIG. 4 is a flow chart for use in illustration of the procedure of transmitting on the transmitting side in the second embodiment. Referring to FIG. 4, transmission data is prepared in S51, and the data is divided in S52. These operations are similar to those in the first embodiment. FIG. 5 shows the state of data divided into blocks. (A) shows original data, (B) shows the state of data divided into three blocks, and (C) shows the state of data produced by updating the data blocks in version 1 to version 2.

In S53, the version is initialized. IN S54, the data block (transmission block) to transmit is set to the first portion of divided data (which corresponds to block 1 in FIG. 5). In S55, the address at which the receiving side will position the transmission data is transmitted. In S56, the present version is transmitted, in S57, the transmission blocks set in S54 and in S60 which will be described later are transmitted to the receiving side. In S58 it is determined if there is an updating of the transmission data. If there is an updating, the processing proceeds to S61, and to S59 otherwise. It is determined in S59 if the data transmitted in S59 is the last block of the divided data (which corresponds to block 3 in FIG. 6). If it is the last block, the operation proceeds to S54 to transmit the data from the beginning, and to S60 otherwise. In S60, the transmission data is set to the next block, and the processing returns to S55. The processings in S61 and after are executed if it is determined in S58 that data is updated in which case the content of transmission block is updated in S61, and the version is updated in S62 (which corresponds to ver. 1→ver. 2 in FIG. 5).

Figure 6:
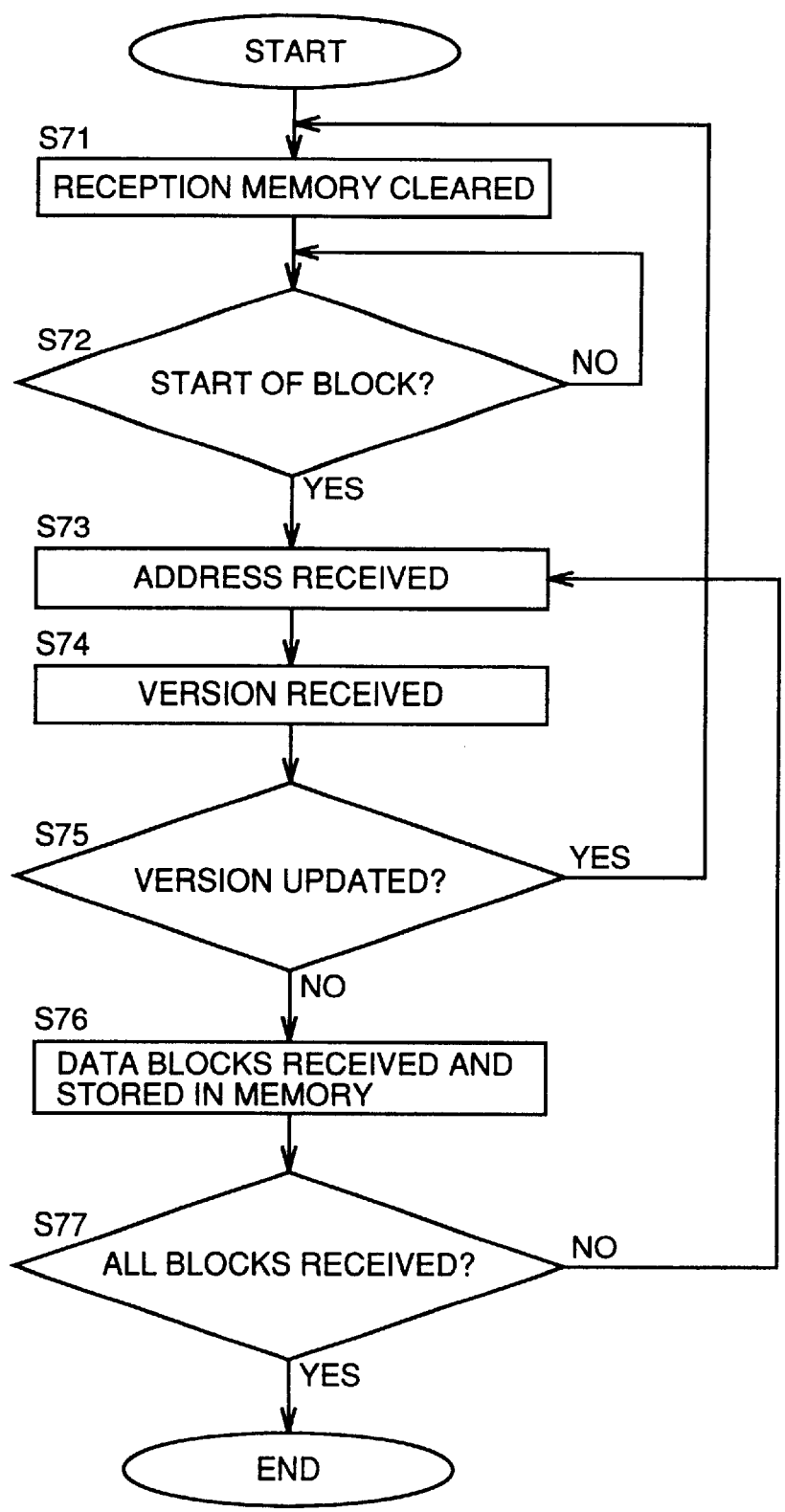
FIG. 6 is a flow chart for use in illustration of reception according to the second embodiment.

Now, the procedure on the receiving side in the second embodiment will be described in conjunction with a flow chart in FIG. 6. In S71, the reception memory is cleared, thus initializing the reception state. The start of a block is waited for in S72, and the processing proceeds to S73 if the start of the block is confirmed. In S73, address data transmitted in S55 from the transmitting side is received and the information is stored in the register. The version is received (S74), and it is determined if the version information transmitted in S56 from the transmitting side has changed from the version information received last time to determine the presence/absence of an updating of data (S75). If there is an updating, the processing proceeds to S71, and reception is started all over from the beginning. If there is no updating, the processing proceeds to S77. Stated differently, data is received once again if the version changes. In S76, data blocks transmitted in S57 from the transmitting side are received, and stored in the memory according to the address data stored in the register in S73. In S77, it is determined if all the blocks have been received. If all the blocks have not been received, the processing returns to S73, and receives the next block. If all the blocks have been received, the reception completes (S77). In this case, since the data is stored in the memory according to the address information, rearrangement is not necessary.

Third Embodiment

Figure 7:
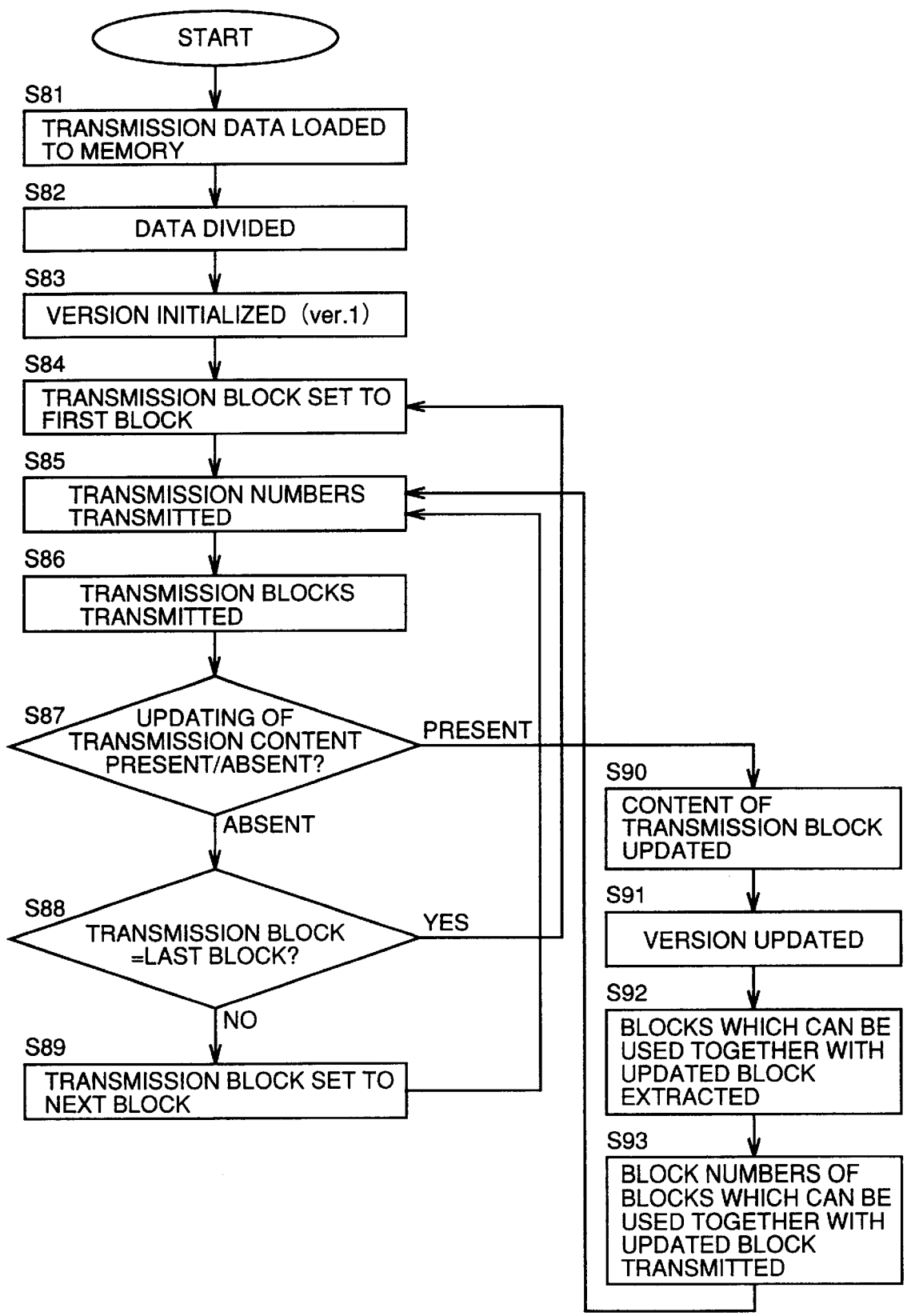
FIG. 7 is a flow chart for use in illustration of transmission according to a third embodiment of the invention.

Now, a third embodiment will be described. FIG. 7 is a flow chart for use in illustration of the procedure of transmitting data from the transmitting side according to the third embodiment. Referring to FIG. 7, in S81, transmission data is prepared, and the data is divided in S82. The method of dividing the data is the same as that in the foregoing embodiments. FIG. 8 shows an example of functionally divided data. (A) is original data formed of three functions: indication function, operation function, and communication function, (B) shows the state of data divided into blocks on a function-basis, and (C) shows the state after updating.

In S83 in FIG. 7, the version is initialized. In S84, a data block (transmission block) to transmit is set to the first portion of divided data (which corresponds to block 1 in FIG. 8). In S85, transmission numbers representing information such as the order of transmitting data is transmitted. In the example shown in FIG. 8, data blocks are attached with such transmission numbers in the order they are divided. In S86, transmission blocks set in S84 and S89 which will be described later are transmitted to the receiving side. In S87, it is determined if there is an updating of the transmission data. If there is an updating, the processing proceeds to S90, and to S88 otherwise. It is determined in S88, if the data transmitted in S86 is the last block of the divided data (which corresponds to block 3 in FIG. 8).

If it is the last block, the processing proceeds to S84 to transmit the data from the beginning. If is not the last block, the processing proceeds to S89. In S89, data to transmit in S86 is set to the next block, and the processing returns to S85. The processings in S90 and after are executed if it is determined in S87 that the data is updated. In S90, the content of the transmission block is updated (in FIG. 8, the indication function in block 1 and the operation function in block 2 are updated), and the version is updated in S91. In S92, data blocks which can be used after the updating of the data are extracted (in FIG. 8, the indication function in block 1 and the communication function both in block 3 can be used after updating, while the operation function cannot be used after the updating.) The transmission numbers of the data blocks extracted in S92 are transmitted and the processing proceeds to S85.

Figure 9:
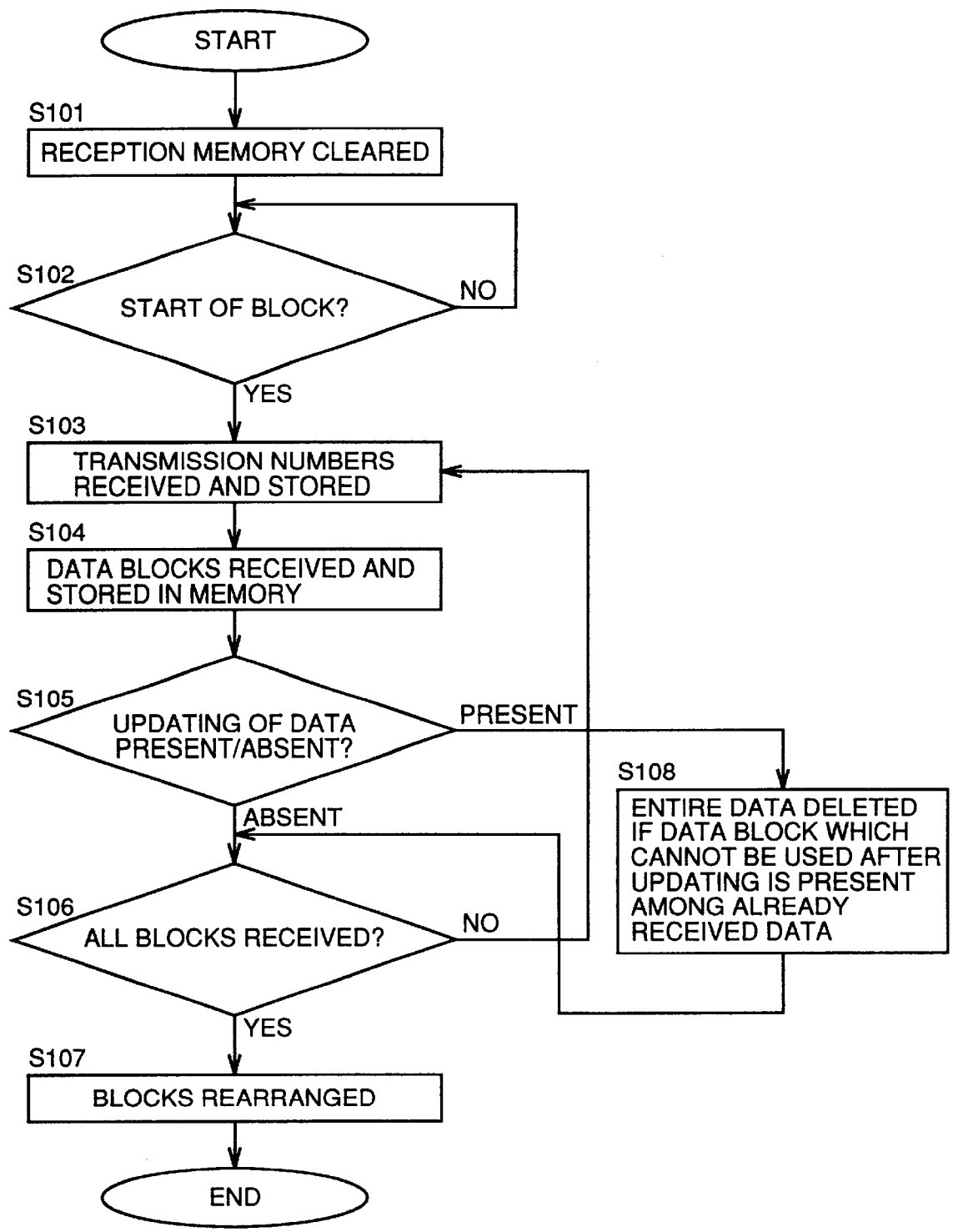
FIG. 9 is a flow chart for use in illustration of a procedure of reception according to the third embodiment.

The processing on the receiving side will be described. FIG. 9 is a flow chart for use in illustration of the processing on the receiving side. The reception memory is cleared to initialize the reception state (S101). The start of a block is waited for (S102), and the processing proceeds to S103 if the start of the block is confirmed. Transmission numbers transmitted in S85 from the transmitting side are received in S103, and the information is stored in the memory. Data blocks transmitted in S86 from the transmitting side are received (S104), and stored in the memory so as to manage the data using the transmission numbers received in S103. Depending on if there is data to be transmitted in S93 from the transmitting side, the presence/absence of an updating of the data is determined (S105), if there is any, it is determined that there is data updating, thus proceeding the processing to S018, and to S106 otherwise. In S106 the transmission numbers received in S103 are determined, in order to determine if the entire data is received. If all the data blocks are received, the processing proceeds to S107, and the processing returns to S103 otherwise. In S107, based on the transmission numbers received in S103, the data received in S104 is rearranged, thus completing the receiving operation. If it is determined in S105 that the data has been updated (update present in S105), the processing in S108 is executed, the data which was received before the updating and cannot be used is eliminated based on the information received in S105.

In the example shown in FIG. 8, if data in block 2 is not received, for the operation function after updating, the data before updating cannot be used, and therefore all the data is eliminated. If the data in block 2 after the updating has been received, the reception may be continued. The operation proceeds to S106 thereafter.

Fourth Embodiment

Figure 10:
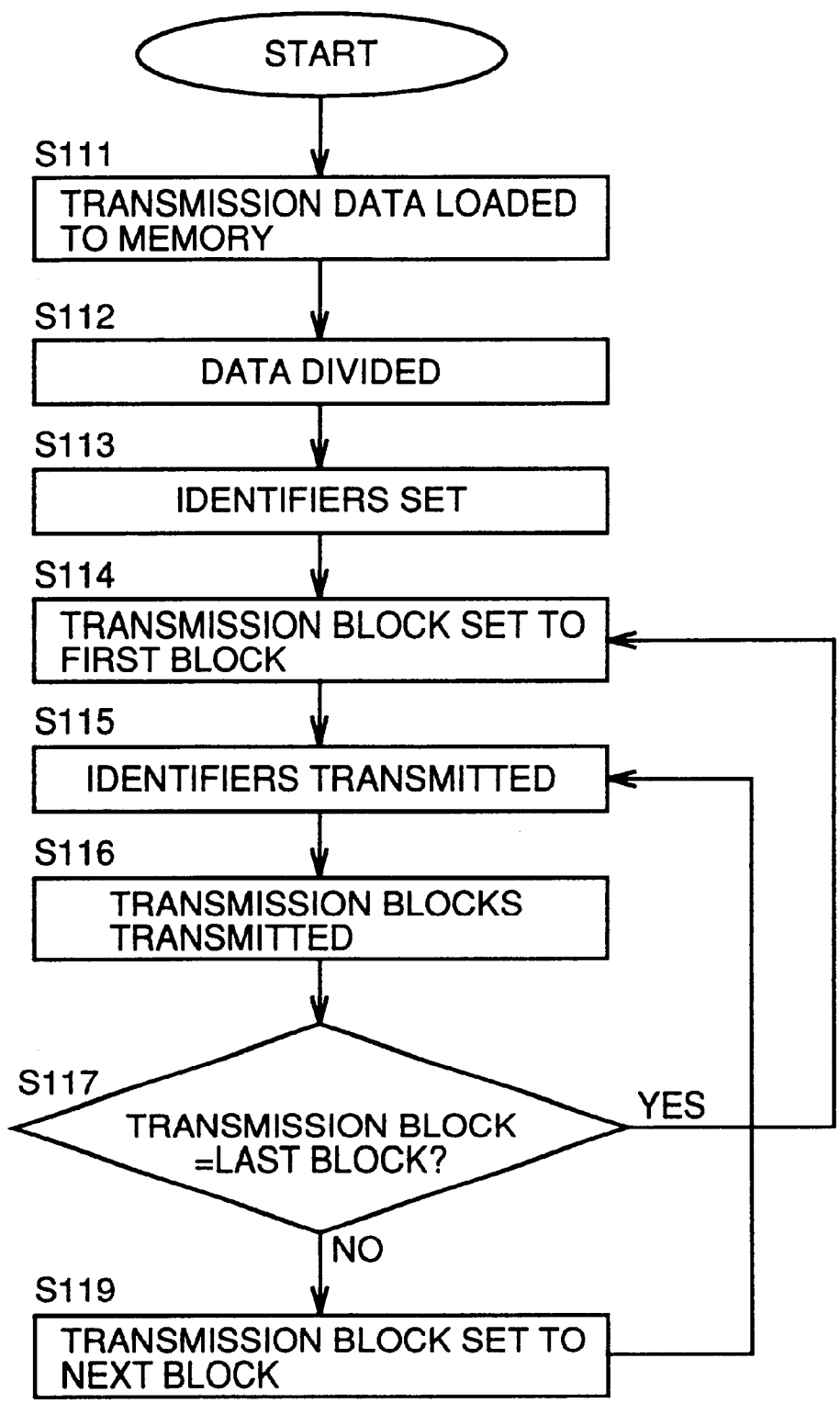
FIG. 10 is a flow chart for use in illustration of a procedure of transmission according to a fourth embodiment of the invention.
Figure 11:
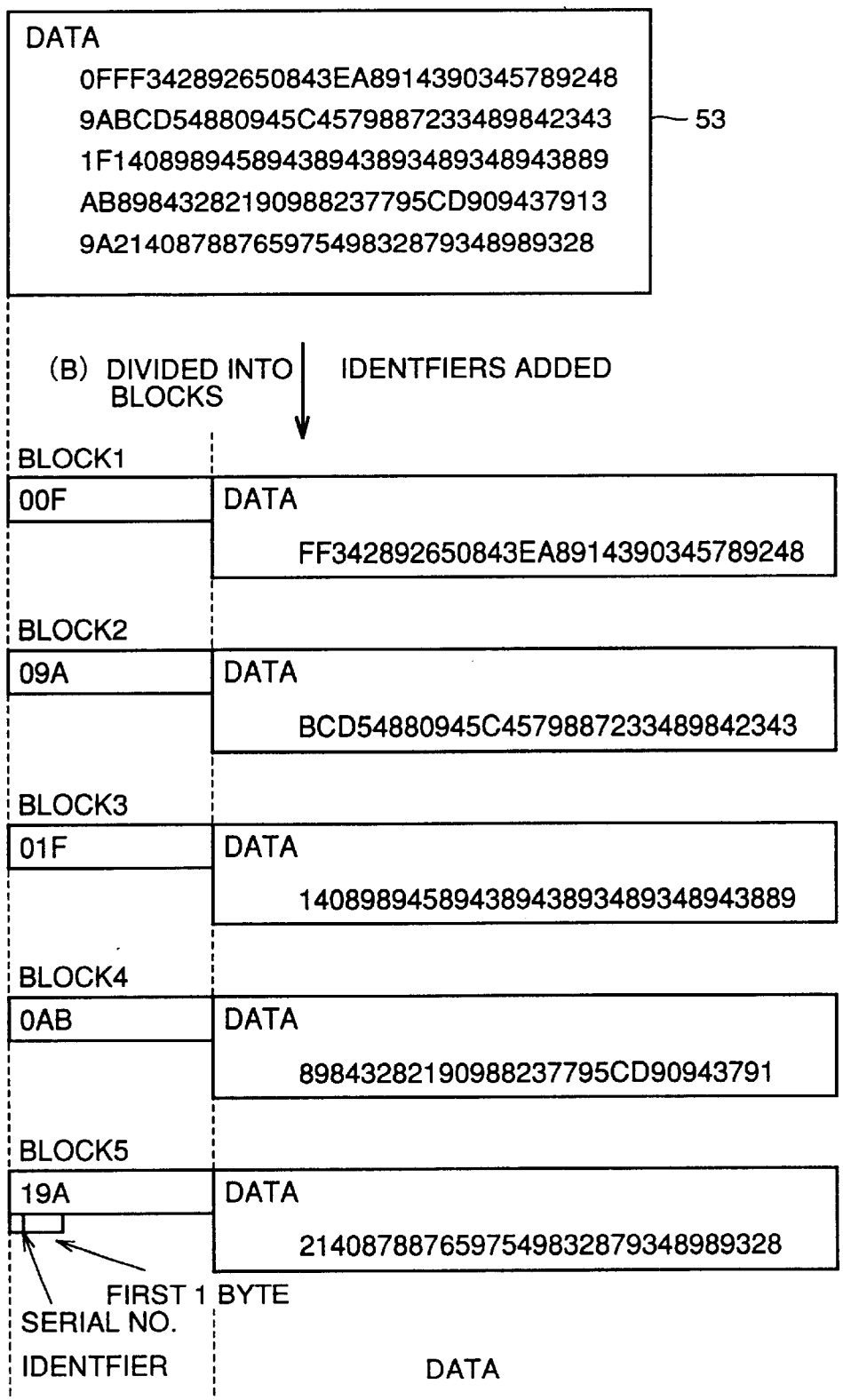
FIG. 11 shows an example of data divided lengthwise.

Now, a fourth embodiment of the invention will be described. FIG. 10 is a flow chart for use in illustration of the procedure of transmission on the transmitting side according to the fourth embodiment. Referring to FIG. 10, transmission data is prepared (S111), and divided into blocks (S112). The procedure is the same as that in the foregoing embodiments. FIG. 11 shows an example of data divided lengthwise. (A) shows original data, and (B) shows data divided into blocks and attached with identifiers. Referring to FIG. 10, identifiers for data blocks produced by dividing in S112 are set (S113). Part of the data is used as an identifier. In the example shown in FIG. 11, 4-bit serial numbers are used for the case in which the first 1 byte of data is identical to a data identifier. In S114, a transmission block is set to the first portion of the data divided in S112 (which corresponds to block 1 in FIG. 11.) The identifier of the data block to transmit is transmitted (S115). Transmission blocks set in S114 and S119 which will be described later are transmitted to the receiving side (S116). It is determined in S116 if the transmitted data is the last block of the data divided in S112 (which corresponds to block 5 in FIG. 11) (S117). If it is the last block, the processing proceeds to S114 to transmit the data from the beginning, and to S119 otherwise. In S119, the data to transmit in S116 is set to the next block, and the processing proceeds to S115.

Figure 12:
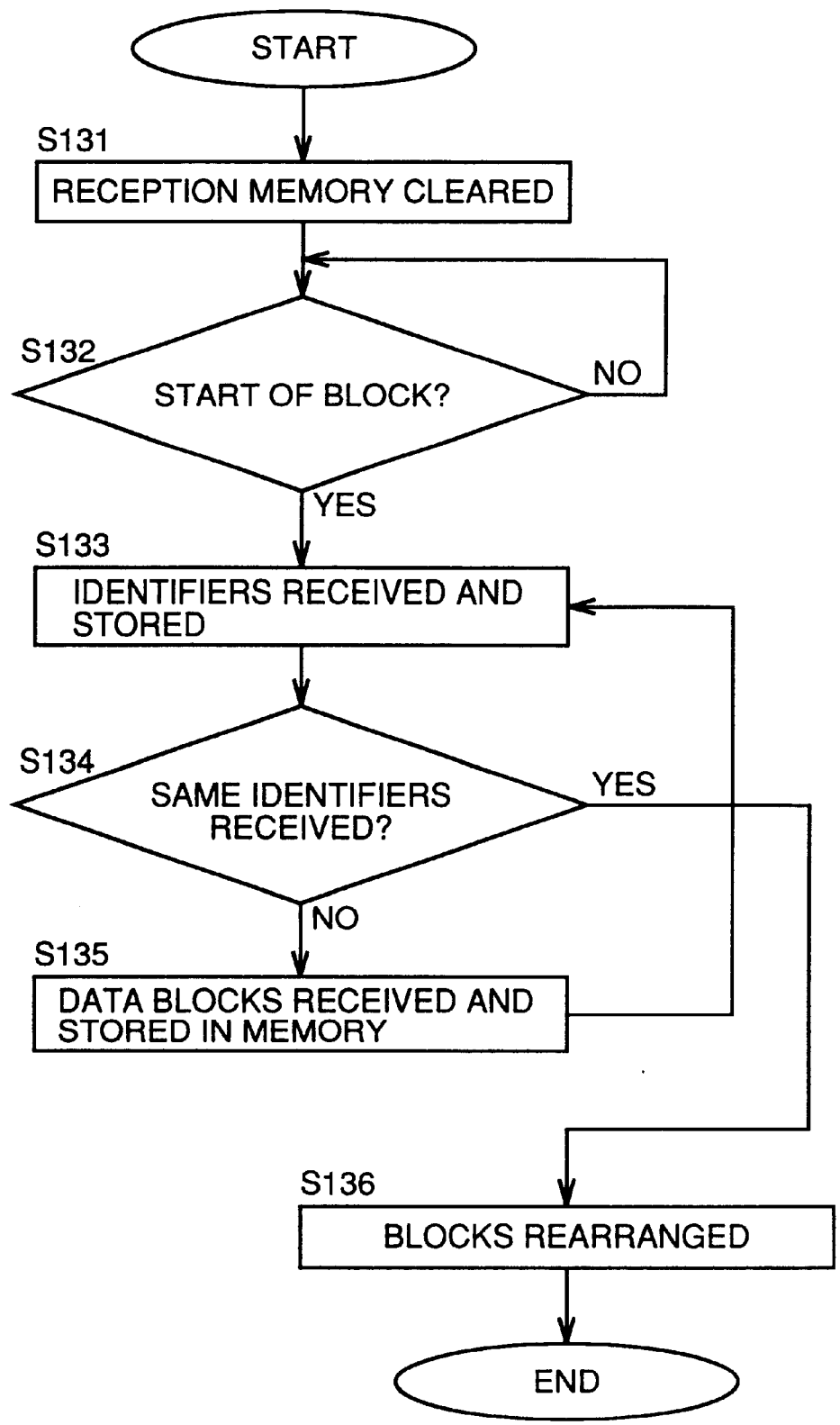
FIG. 12 is a flow chart for use in illustration of a procedure of reception according to the fourth embodiment.

Now, the processing on the receiving side will be described in conjunction with FIG. 12. The reception memory is cleared to initialize the reception state (S113). The start of a block is waited for (S132), and the processing proceeds to S133 if the start of the block is confirmed. In S133, identifiers transmitted in S115 from the transmitting side are received, and the information is stored in the memory. Depending on if the same identifiers as the identifiers received in S133 have been received before, it is determined if all the blocks have been received (S134). If all the blocks have not been received, the processing proceeds to S135, and to S136 otherwise. The data of blocks transmitted in S116 from the transmitting side are received and stored in the memory (135), and the processing returns to S133. In S135, if the same identifiers are received, data is rearranged, thus completing the receiving operation (S136).

Fifth Embodiment

Figure 13:
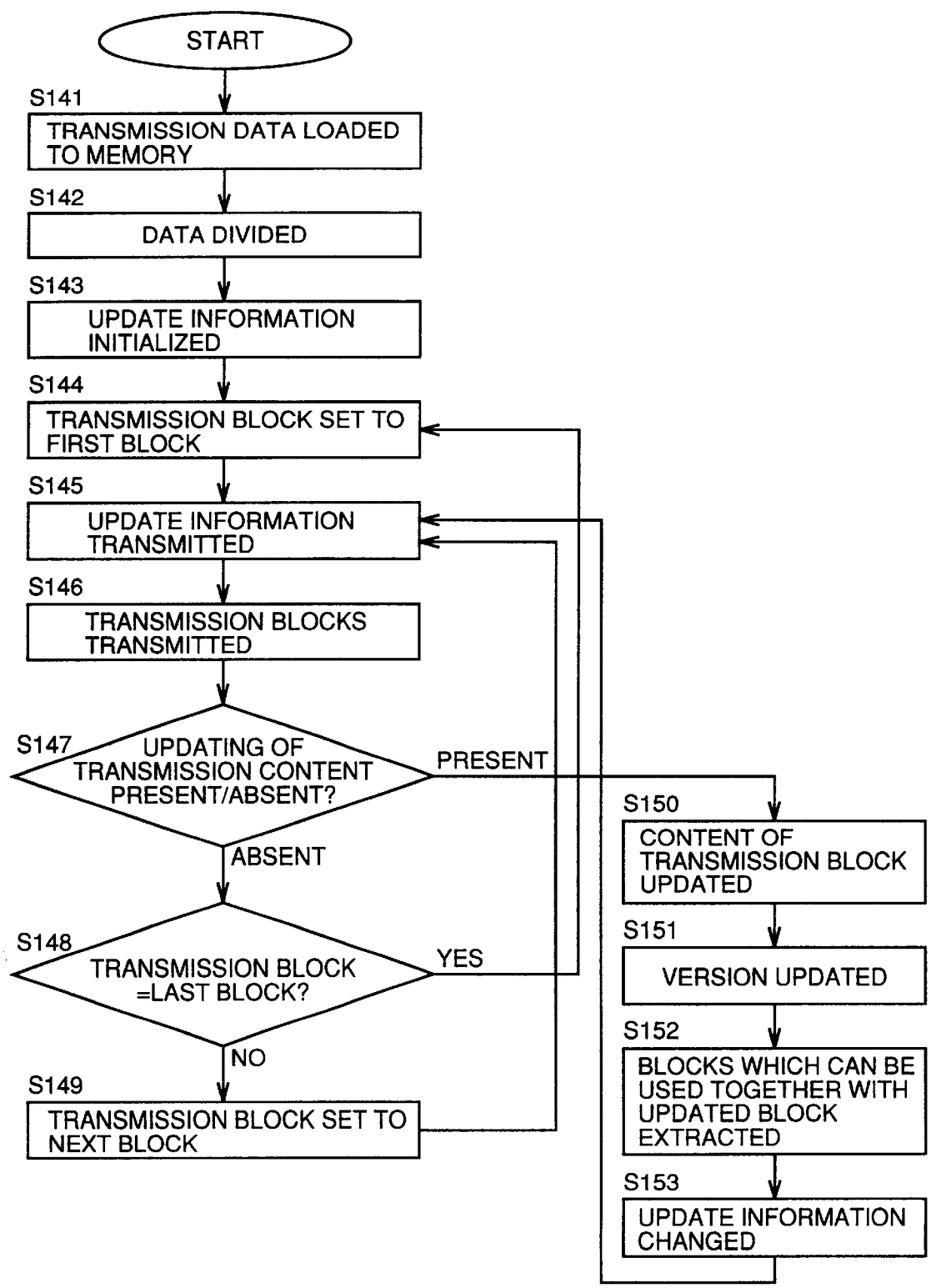
FIG. 13 is a flow chart for use in illustration of a procedure of transmission according to a fifth embodiment of the invention.

A fifth embodiment of the invention will be described. FIG. 13 is a flow chart for use in illustration of the procedure on the transmitting side in this embodiment. Referring to FIG. 13, data to transmit is prepared (S141) and divided into blocks (S142). The procedure of dividing data is the same as that in the foregoing embodiments. FIG. 14 shows an example of data divided functionally. (A) shows original data, (B) shows the state of the data divided into blocks, and (C) shows the state after an updating of the data.

Referring to FIG. 13, update information allocated to each block is initialized (S143). In FIG. 14, it is the portion set to ver. 1. Data block to transmit in S146 is set to the first portion of the data divided in S142 (which corresponds to block 1 in FIG. 14 )(S144). In S145, the update information of the data to transmit (set in S143 and S153) are transmitted (S145).

The transmission blocks set in S144 and in S149 which will be described later are transmitted to the receiving side (S146). Then, it is determined if there is an updating of the transmission data. If there is an updating, the processing proceeds to S150, and to S148 otherwise. If there is no such updating, it is determined if the data transmitted in S146 is the last block of the data divided in S142 (which corresponds to block 3 in FIG. 4) (S148). If it is the last block, the processing proceeds to S144 to transmit the data from the beginning. If it is not the last block, the processing proceeds to S149. In S149, the data to transmit in S146 is set to the next block, thus returning the processing to S144. The operations in S150 and after are executed if it is determined in S147 that the data is updated. In S150, the content of the transmission block is updated (in the example shown in FIG. 14, the indication function of block 1 is updated), and the version is updated in S151. Data blocks which can be used after updating the data are extracted in S152. In FIG. 14, the indication function in block 1 and the communication function in block 3 can be used after updating, while the operation function in block 2 cannot be used after the updating. The information extracted in S152 is recorded as update information (S153). In FIG. 14, the information includes for example "ver. 2, ver. 1 combine ok" in blocks 1 and 3, and "ver. 2, ver. 1 combine no" in block 2 at (C).

Figure 15:
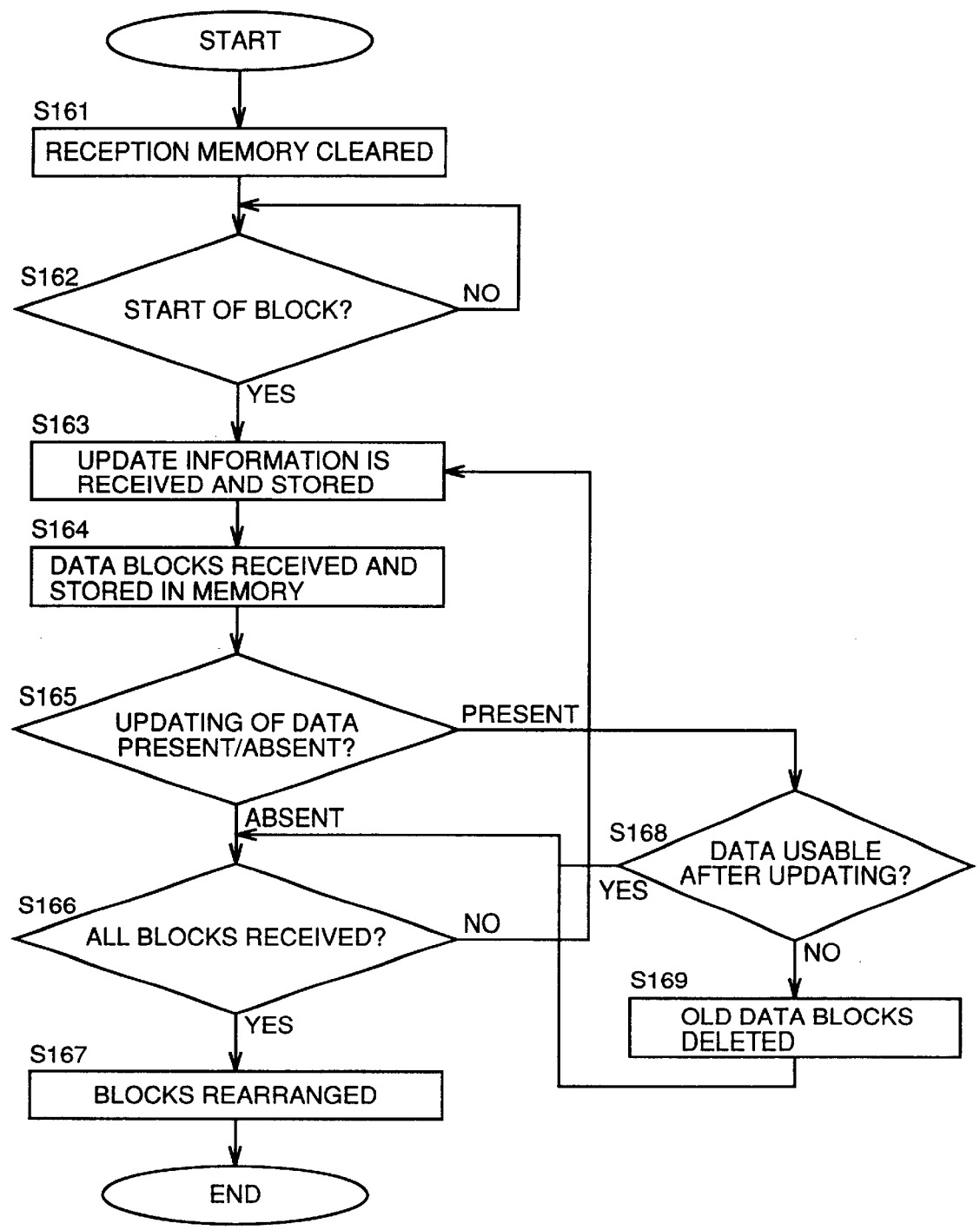
FIG. 15 is a flow chart for use in illustration of a procedure of reception according to the fifth embodiment.

The procedure on the receiving side will be described in conjunction with FIG. 15. The reception memory is cleared to initialize the reception state (S161). The start of a block is waited for (S162), and the processing proceeds to S163 if the start of the block is confirmed. In S163, the update information transmitted in S145 from the transmitting side is received and stored in the memory. The data blocks transmitted in S146 from the transmitting side is received, and stored in the memory together with the received update information (S164). In S165, the received update information (ver. 1, and ver. 2 in FIG. 14) is used to determine the presence/absence of an updating of the data. If there is an updating (in the example shown in FIG. 14, if ver. 1 is received and then ver. 2 is received), the processing proceeds to S168 based on the determination that there was an updating of the data. The processing proceeds to S166 otherwise. Then, it is determined if the entire data has been received (S166), and the processing proceeds to S167 if all the data blocks have been received, and the processing is repeated from S163 otherwise. Then, the data is rearranged, thus completing the reception (167). If it is determined in S165 that there was an updating of the data, the processing proceeds to S168, and it is determined if the data received in S164 can be used together with the data before updating based on the information received in S163. If the data cannot be used (in the example shown in FIG. 14, if block 2 is received), the processing proceeds to S169, and if the data can be used, the processing returns to S166. The data of old version is eliminated in S169. In the example shown in FIG. 14, the data of ver. 1 is eliminated. Then the processing proceeds to S166. The operations in S168 and after permits the data after the updating to be used together with the data before updating if possible, and only the data after the updating is used if the data before the updating cannot be used.

Sixth Embodiment

Figure 16:
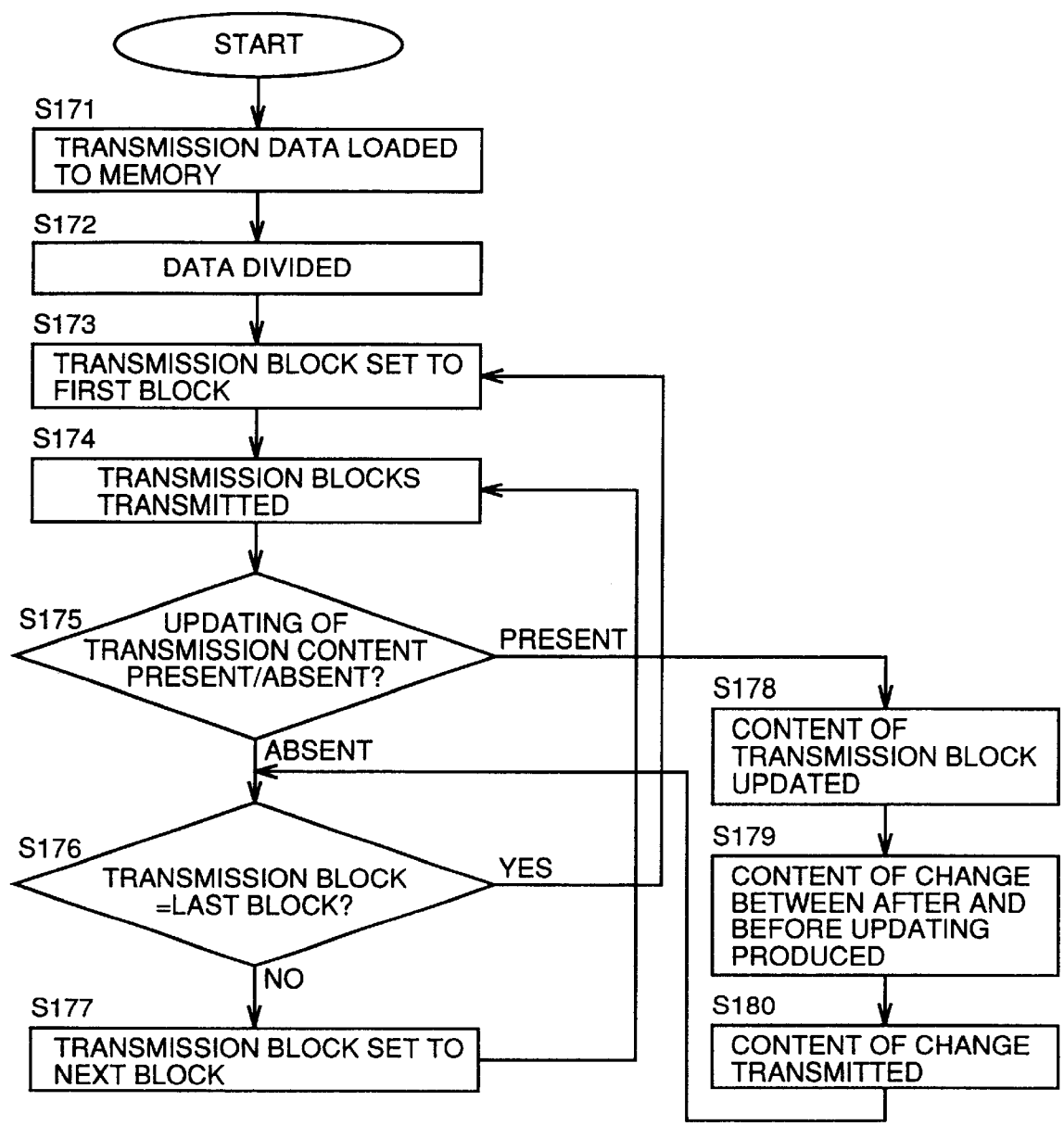
FIG. 16 is a flow chart for use in illustration of a procedure of transmission according to a sixth embodiment of the invention.

Now, a sixth embodiment will be described. FIG. 16 is a flow chart for use in illustration of the procedure of transmitting in the sixth embodiment. Referring to FIG. 16, transmission data is prepared (S171), and divided into data blocks (S172). The method of dividing the data is the same as that in the foregoing embodiments. A data block to transmit in S174 (transmission block) is set to the first portion of the data divided in S172 (which corresponds to block 1 in the example shown in FIG. 2) (S173). The transmission blocks set in S173 and S177 which will be described later are transmitted to the receiving side (S174). It is determined if there is an updating of the transmission data (S175), and if there is any updating, the processing proceeds to S178, and to S176 otherwise. In S174, it is determined if the data transmitted is the last block of the data divided in S172 (which corresponds to block 3 in the example shown in FIG. 8) (S176). If it is the last block, the processing proceeds to S173 to transmit the data from the beginning, and to S177 otherwise. The data to transmit is set to the next block, and the processing returns to S174. The operations in S178 and after are executed if it is determined in S175 that the data has been updated. The content of the transmission block is updated (S178), and difference is extracted based on a comparison of data before and after updating (S179). In the example shown in FIG. 2 "CLEAR"→"RAINY" in block 4. In S179, the difference extracted in S179 is transmitted (S180), and the processing returns to S176.

Figure 17:
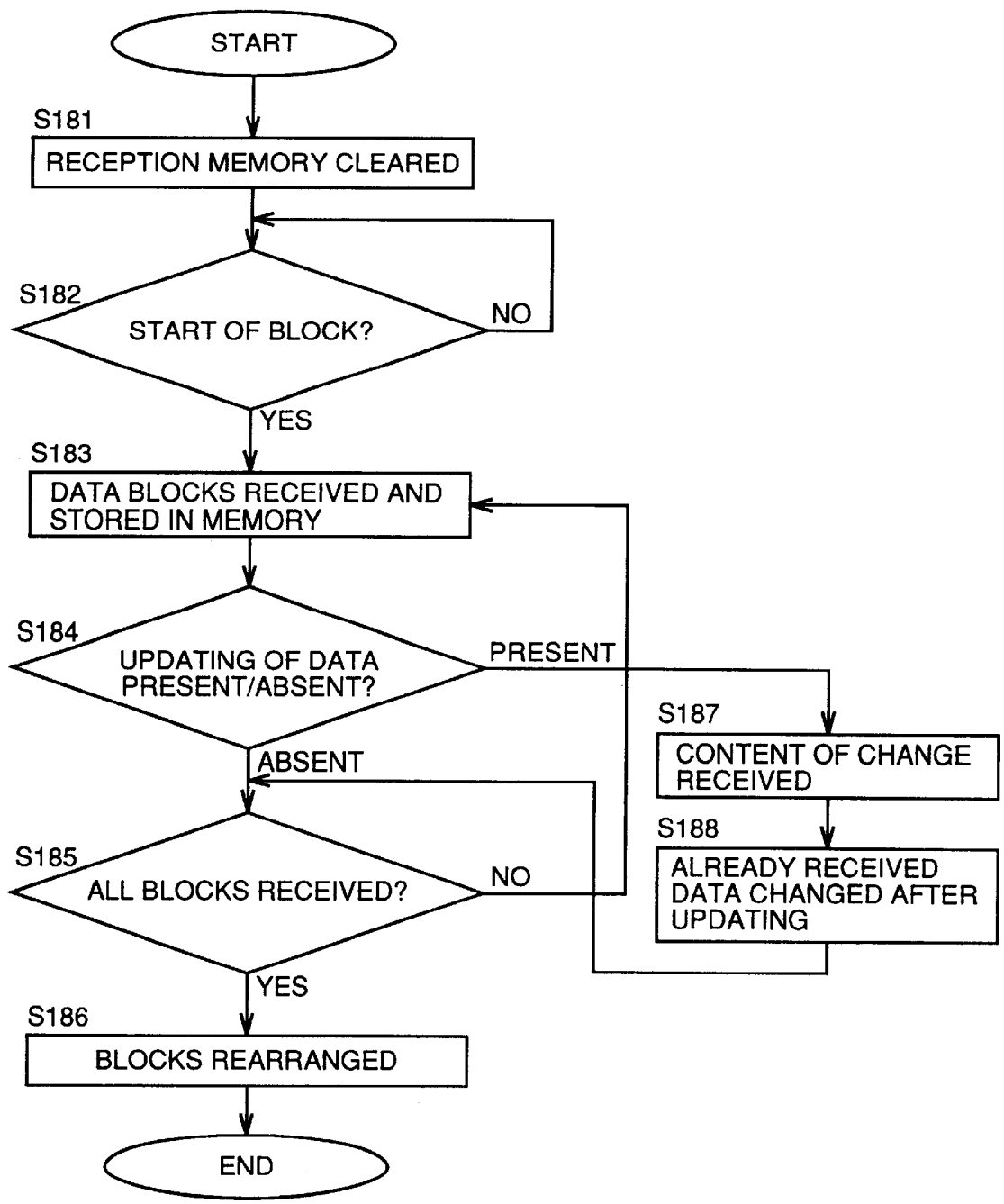
FIG. 17 is a flow chart for use in illustration of a procedure of reception according to the sixth embodiment.

Now, the procedure on the receiving side in the sixth embodiment will be described in conjunction with FIG. 17. Referring to FIG. 17, the reception memory is cleared to initialize the reception state (S181). The start of a block is waited for (S182), and if the start of the block is confirmed, the processing proceeds to S183. Data blocks transmitted in S174 from the transmitting side are received and stored in the memory (S183). Depending on if there is data to be transmitted in S180 from the transmitting side, the presence/absence of an updating of data is determined (S184). If there is an updating, the processing proceeds to S187, and to S185 otherwise. In S185, it is determined if the entire data has been received and if all the blocks have been received, the processing proceeds to S186, and the processing from S183 is repeated otherwise. In S186, the data received in S183 is rearranged, thus completing the reception operation. The operations in S187 and after are executed if it is determined in S184 that there is an updating of the data. The data transmitted in S180 is received (S187). The data which has been received until S183 is changed into the data after updating using the data received in S187 (S188). More specifically, in the example shown in FIG. 2, the data in block 4 "CLEAR" is changed to "RAINY". Thereafter the operation proceeds to S185 and the reception is continued. The foregoing operations permit data after the updating to be available on the receiving side which continues from before the updating.

Seventh Embodiment

Figure 18:
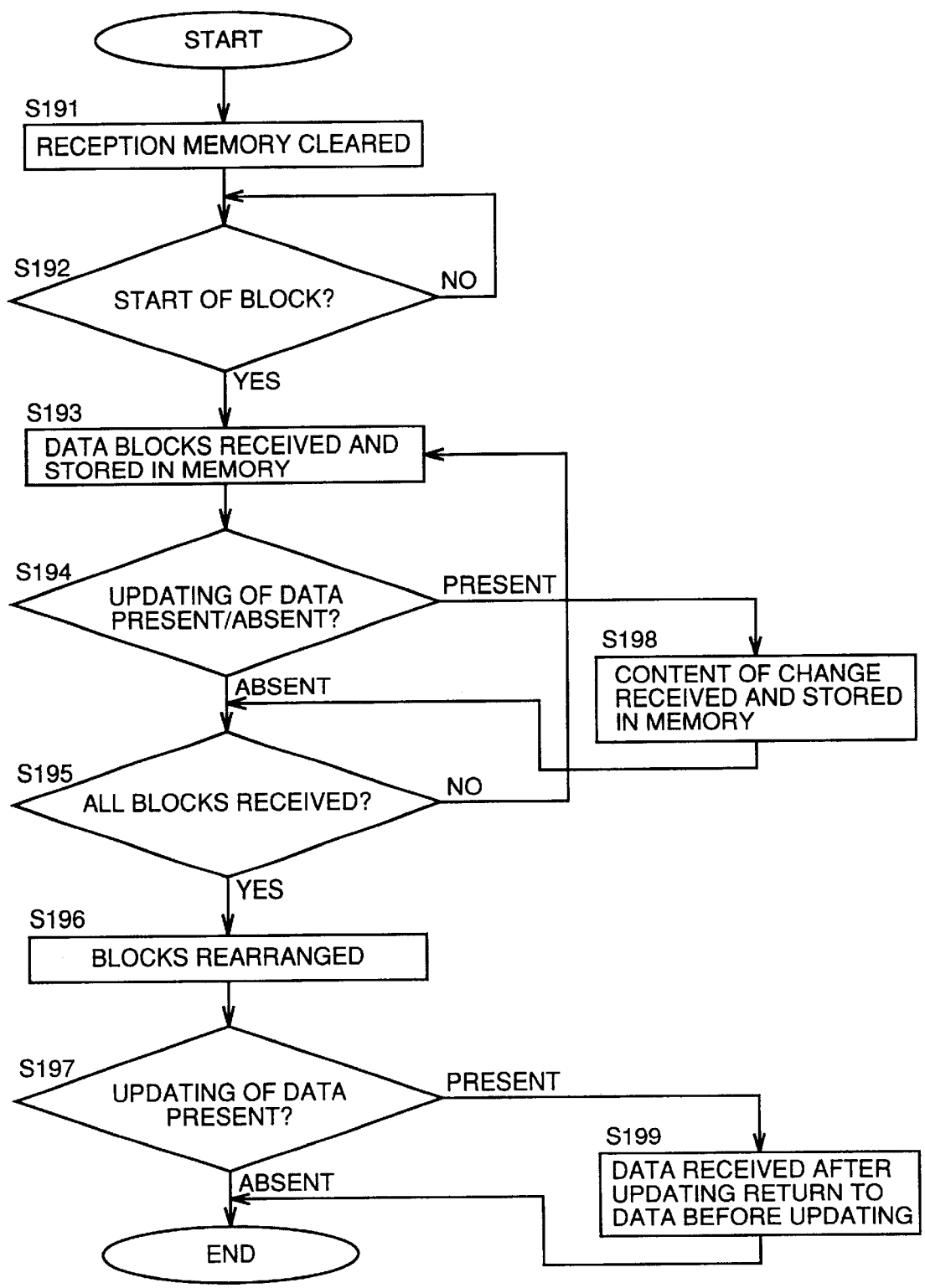
FIG. 18 is a flow chart for use in illustration of a procedure of reception according to a seventh embodiment of the invention.

A seventh embodiment will be described. The procedure of the transmitting side is the same as that in the sixth embodiment described in conjunction with FIG. 16, with a detailed description thereof being omitted. FIG. 18 is a flow chart for use in illustration of the procedure of processing on the receiving side in the seventh embodiment. Referring to FIG. 18, the reception memory is cleared (S191) to initialize the reception state. The start of a block is waited for (S192), and if the start of the block is confirmed, the processing proceeds to S193. In S193, data blocks transmitted in S174 from the transmitting side are received and stored in the memory. Depending on if there is data to be transmitted in S180 from the transmitting side, the presence/absence of an updating of the data is determined (S194). If there is such data, it is determined that there was a data updating, the processing proceeds to S198, and the processing proceeds to S195 otherwise. The operation in S198 is executed if it is determined in S194 that there was an updating of the data. The data transmitted in S180 is received and stored in the memory. Thereafter the processing proceeds to S195 to resume receiving. In S195, it is determined if the entire data has been received, and if all the data blocks have been received, the processing proceeds to S196, and to S193 otherwise. In S196, the data received in S193 is rearranged, and if there is a change to be recorded in S198, the processing in S199 is executed as data updating is present (S197). If there is no change in the content, the processing completes. In S199, if it is determined in S194 that data has been updated, the data received in S193 is returned to the data before the updating using the change recorded in S198, then the reception completes. More specifically, in the example shown in FIG. 2, in the data in block 4, "RAINY" is changed to "CLEAR". These operations permit the receiving side to obtain the data before the updating.

Eighth Embodiment

Figure 19:
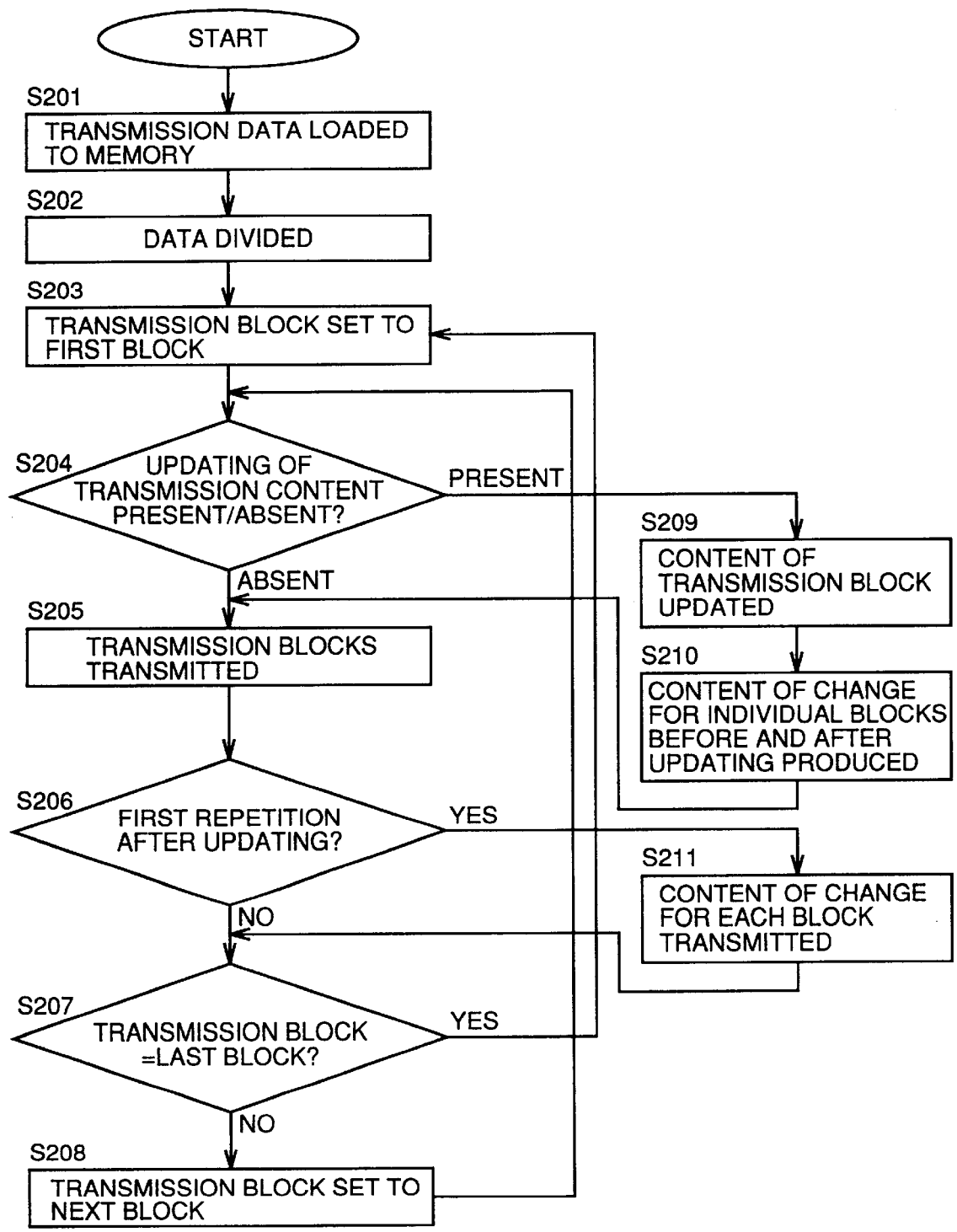
FIG. 19 is a flow chart for use in illustration of a procedure of transmission according to an eighth embodiment of the invention.
Figure 20:
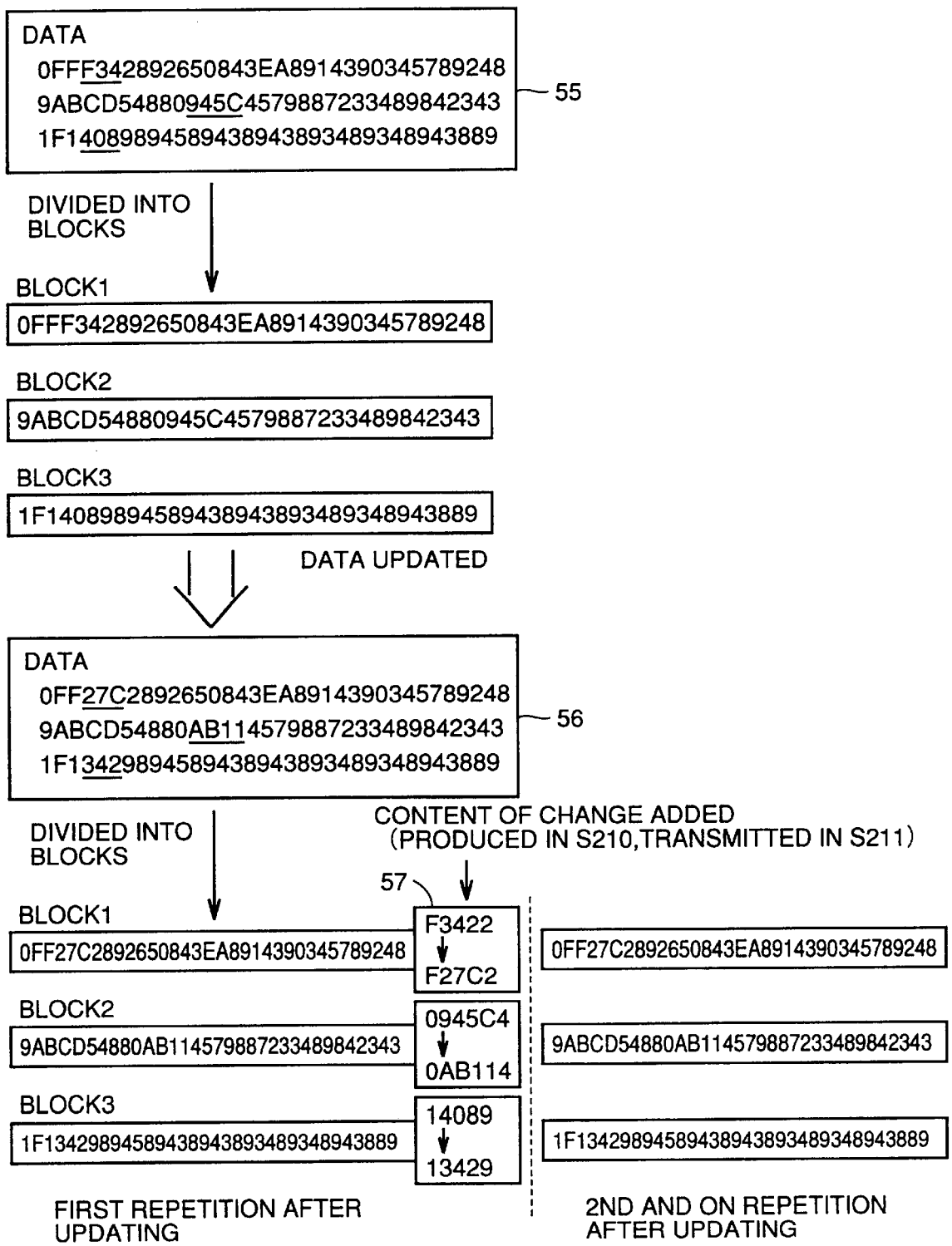
FIG. 20 shows an example of data divided lengthwise.

Now, an eighth embodiment of the invention will be described. FIG. 19 is a flow chart for use in illustration of the procedure on the transmitting side in the eighth embodiment. Referring to FIG. 19, transmission data is prepared (S201), and divided into data blocks (S202). The procedure is the same as that in the foregoing embodiments. FIG. 20 shows an example of data divided lengthwise. (A) shows original data, (B) shows data divided into blocks, and (C) shows data after updating.

In S203, a data block to transmit (transmission block) in S205 is set to the first portion of the data divided in S202 (which corresponds to block 1 in FIG. 20). It is determined in S204 if there is any updating in the content of transmission, and if there is any updating, the processing proceeds to S209. If there is no such updating, the processing proceeds to S205. In S205, transmission blocks set in S202 and in S208 which will be described later are transmitted to the receiving side. During a first repetition after an updating of the data was found in S204 (which corresponds to a time period until blocks 2, 3 and 1 are transmitted if there is an updating before transmitting block 2), the processing proceeds to S211. Otherwise, the processing proceeds to S207. It is determined if data transmitted in S205 is the last block of the data divided in S202 (which corresponds to block 3 in FIG. 20) (S207), and if it is the last block, the processing proceeds to S203 to transmit the data from the beginning. If it is not the last block, the processing proceeds to S208. In S208, the data to transmit in S205 is set to the next block, and the processing returns to S204. The operations in S209 and after are executed if it is determined in S204 that there was an updating of the data. The content of the transmission block is updated(S209), the data of individual blocks before and after the updating is compared, and the difference is stored in the memory (S210), then returning to S205. The operation in S211 is executed if it is determined to be the first repetition after the data was updated. The difference extracted in S210 which corresponds to the block transmitted in S205 is transmitted and the operation returns to S207.

Figure 21:
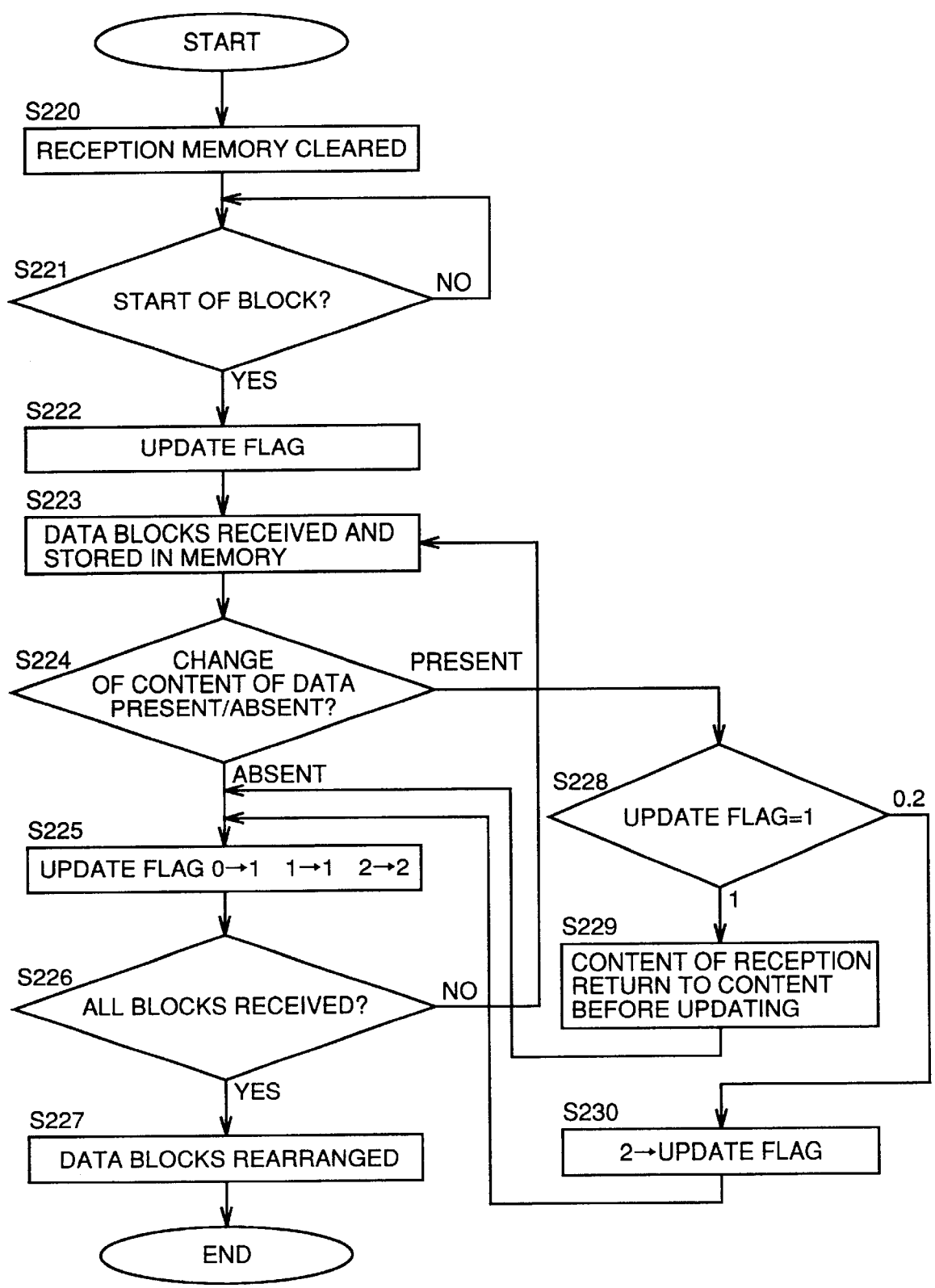
FIG. 21 is a flow chart for use in illustration of a procedure of reception according to the eighth embodiment.

FIG. 21 is a flow chart for use in illustration of the procedure on the receiving side. Referring to FIG. 21, the reception memory is cleared to initialize the reception state. The start of a transmission block is waited for (S221), if the start of the block is confirmed, the processing proceeds to S222. In S222, an update flag indicating the state of updating is set to 0. With the update flag of 0, data has not been received, with the flag of 1, the data has been received, and with the flag of 2, a change in the content of the data has been attached from the beginning of the reception.

Data blocks transmitted in S205 from the transmitting side are received and stored in the memory (S223). Depending on if there is a change in the content transmitted in S211 from the transmitting side, the presence/absence of an updating is determined (S224). If there is such a change, it is determined that the data has been updated, the processing proceeds to S228, and to S225 otherwise. In S225, since one or more data blocks have been received in the state, the update flag of 0 is changed to 1. In S226, it is determined if the entire data has been received, and if all the data blocks have been received, the processing proceeds to S227. Otherwise the processing from S224 is repeated. In S227, the data received in S223 is rearranged, thus completing the reception. The operations in S228 and after are executed if it is determined in S224 that data has been updated. The update flag is determined (S228) and if it indicates the state of reception, the operation proceeds to S225. If the flag indicates the first reception or the state in which the content of a change has been attached from the start of the data, in other words, if the flag indicates 0 or 2, the processing proceeds to S230. In S229, the data blocks received in S223 are returned to the state before updating based on the content of change in S224, and the processing returns to S225. In S230, the update flag is set to 2, and if the content of the change has been received, the processing in S229 is not executed, and the processing returns to S225. These operations permit data before updating to be obtained if the data is updated during the reception on the receiving side.

Ninth Embodiment

Figure 22:
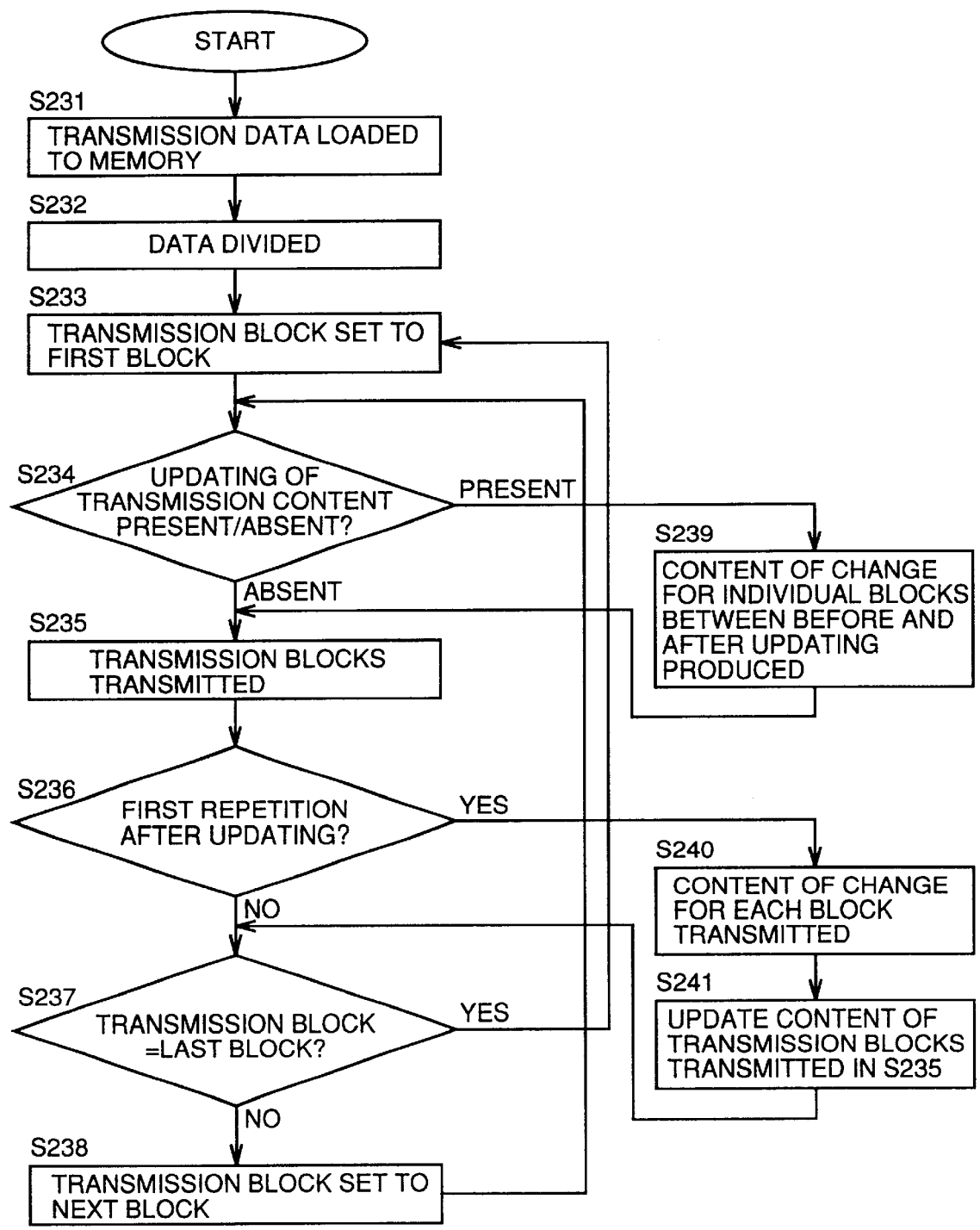
FIG. 22 is a flow chart for use in illustration of a procedure of transmission according to a ninth embodiment of the invention.
Figure 23:
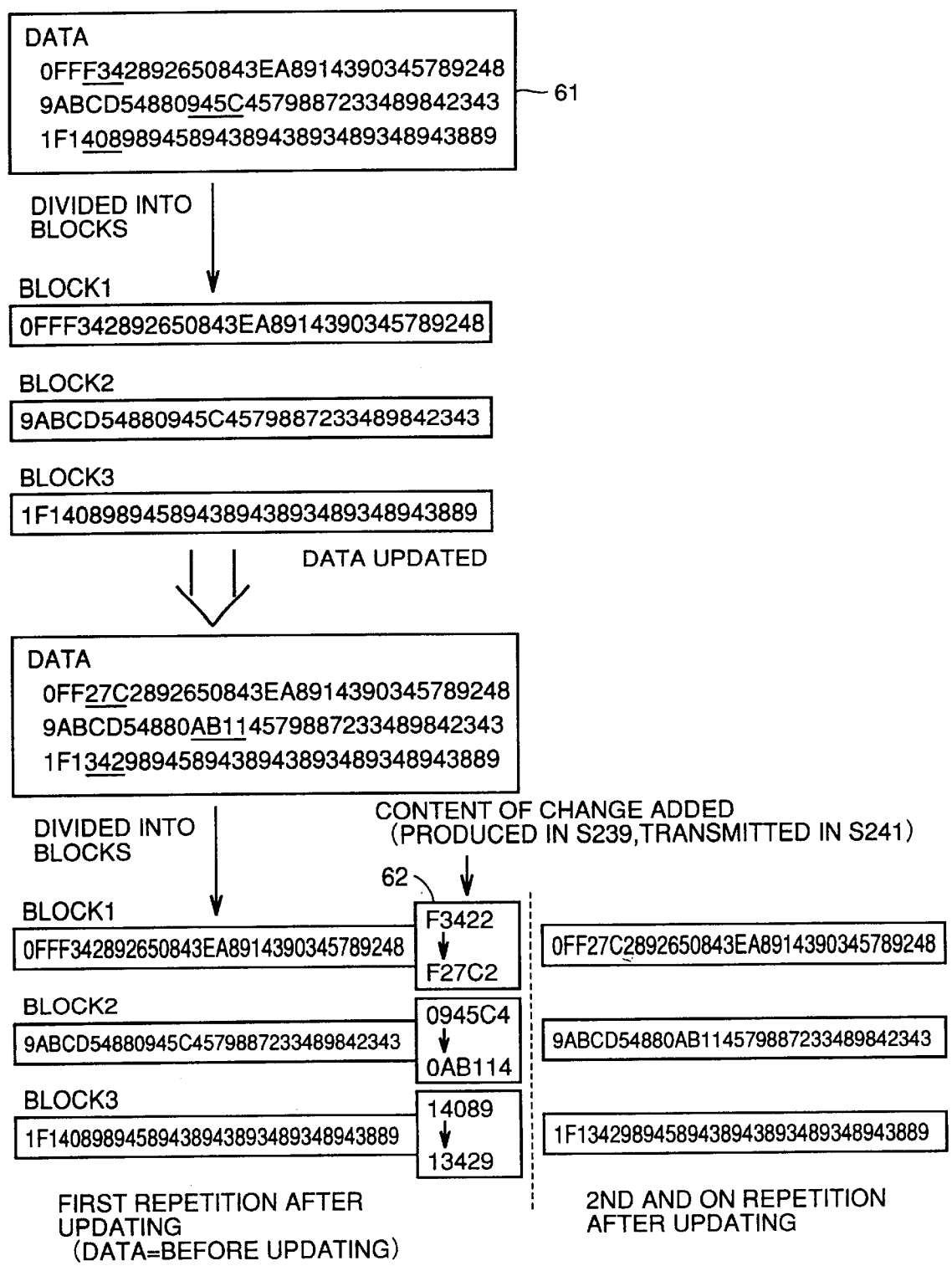
FIG. 23 shows an example of data divided lengthwise.

Now, a ninth embodiment will be described. FIG. 22 is a flow chart for use in illustration of the procedure on the transmitting side in the ninth embodiment. Referring to FIG. 22, transmission data is prepared (S231), and divided into data blocks (S232). The procedure is the same as that in the foregoing embodiments. FIG. 23 shows an example of data divided lengthwise. (A) is original data, (B) shows the state of the data divided into blocks and (C) shows the state of the data after updating.

In S235, a data block to transmit (transmission block) is set to the first portion of the data divided in S232 (which corresponds to block 1 in FIG. 23) (S233). It is determined if there is an updating in the content of transmission (S234), and if there is an updating, the processing proceeds to S239. If there is no such updating, the processing proceeds to S235. In S235, transmission blocks set in S233 and S238 which will be described later are transmitted to the receiving side.

In S234, the processing proceeds to S240 until a first repetition after an updating of the data (S236). In the example shown in FIG. 23, it corresponds to the time period until blocks 2, 3 and 1 are transmitted if there is an updating before transmitting block 2. If it is not the first repetition after the updating (no in S236), the processing proceeds to S237. It is determined if the data transmitted in S235 is the last block of the data divided in S232 (which corresponds to block 3 in FIG. 23) (S237), and if it is the last block, the processing proceeds to S233 to transmit the data from the beginning. If it is not the last block, the processing proceeds to S238. In S238, data to transmit in S235 is set to the next block, and the processing returns to S234.

The operation in S239 is executed if it is determined in S234 that the data was updated. Data of the individual blocks before and after the updating is compared (S239), and the difference is stored in memory, returning to S235. The operations in S240 and after are executed if it is determined that it was the first repetition after the updating of the data. The difference extracted in S239 which corresponds to the block transmitted in S235 is transmitted. The data of the block transmitted in S235 is changed after the updating (S241), and the operation returns to S287.

Figure 24:
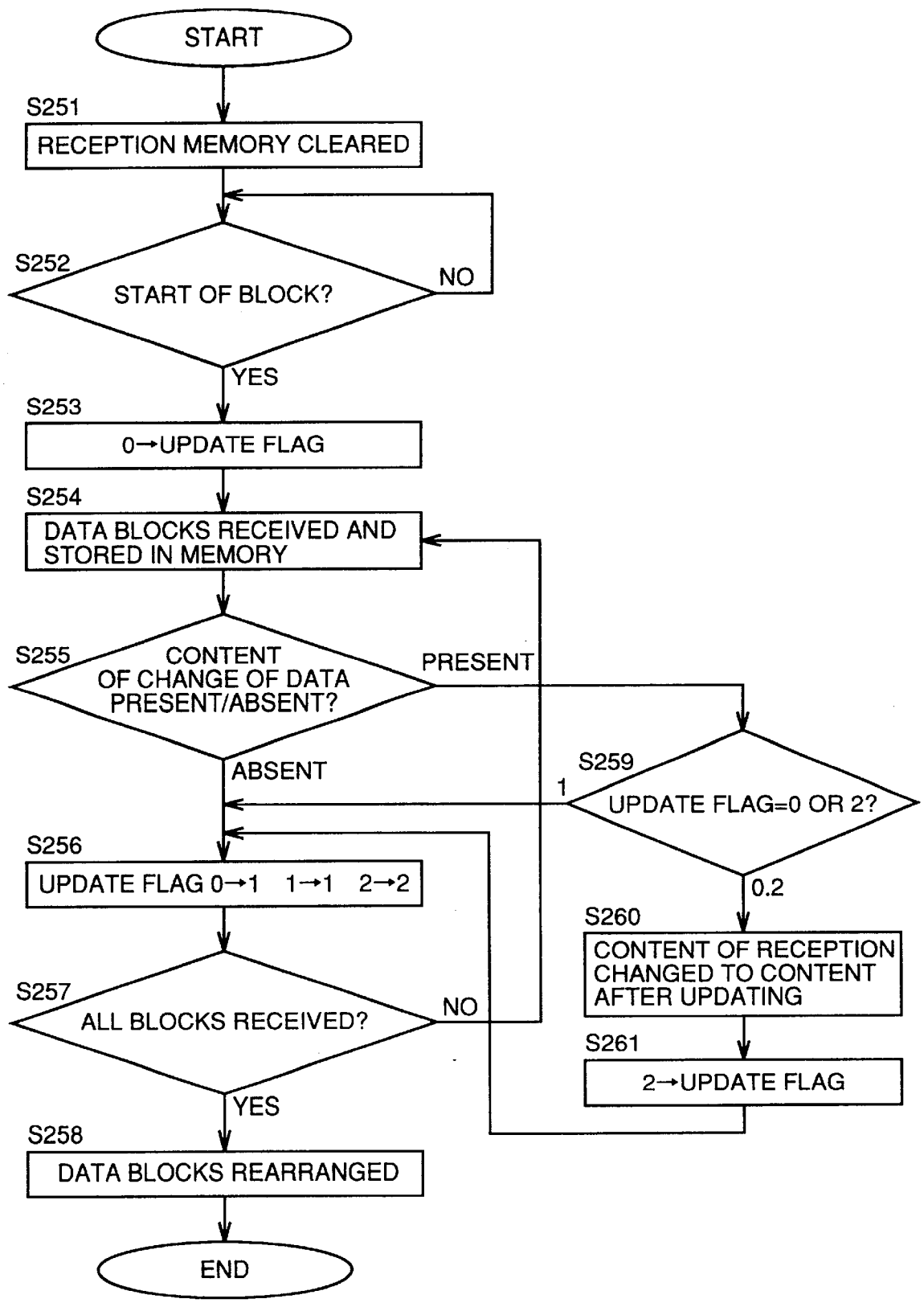
FIG. 24 is a flow chart for use in illustration of a procedure of reception according to the ninth embodiment.

Now, the processing on the receiving side will be described here. FIG. 24 is a flow chart for use in illustration of the procedure on the receiving side. Referring to FIG. 24, the reception memory is cleared to initialize the reception state (S251). The start of a block is waited for (S252), and if the start of the block is confirmed, the processing proceeds to S253. In S253, the update flag indicating the state of updating is set to 0. The update flag of 0 indicates the state in which data is not yet received, the flag of 1 the state in which the data has been received, and the flag of 2 the state in which the content of a change in data has been attached after starting the reception. The data blocks transmitted in S235 from the transmitting side are received and stored in the memory (S254). Depending on if there is a change in the content transmitted in S241 from the transmitting side, the presence/absence of an updating of the data is determined (S255). If there is a change, it is determined that the data has been updated, and the processing proceeds to S259. The processing otherwise proceeds to S259. In S259, since one or more data blocks have been received in this state, the update flag of 0 is changed to 1. In S257, it is determined if the entire data has been received. If all the data blocks have been received, the processing proceeds to S258. The processing from S258 is repeated otherwise. The data received in S254 is rearranged, thus completing the reception operation (S258).

The operations in S255 and after are executed if it is determined in S255 that there was an updating of the data. The update flag is determined (S259). If the flag indicates the state in which the data has been already received, the processing returns to S256. If the flag indicates 0 or 2 which represents the first reception of the state in which the content of a change in the data has been attached from the beginning, the processing proceeds to S260. In S260, the received data is changed based on the content of the change in S255, then the update flag is set to 2 (S261). If the content of the change has been received from the beginning, the processing in S260 is executed, and then the processing returns to S256. These operations permit the data before updating to be obtained if the data is updated during the reception on the receiving side.

Tenth Embodiment

Figure 25:
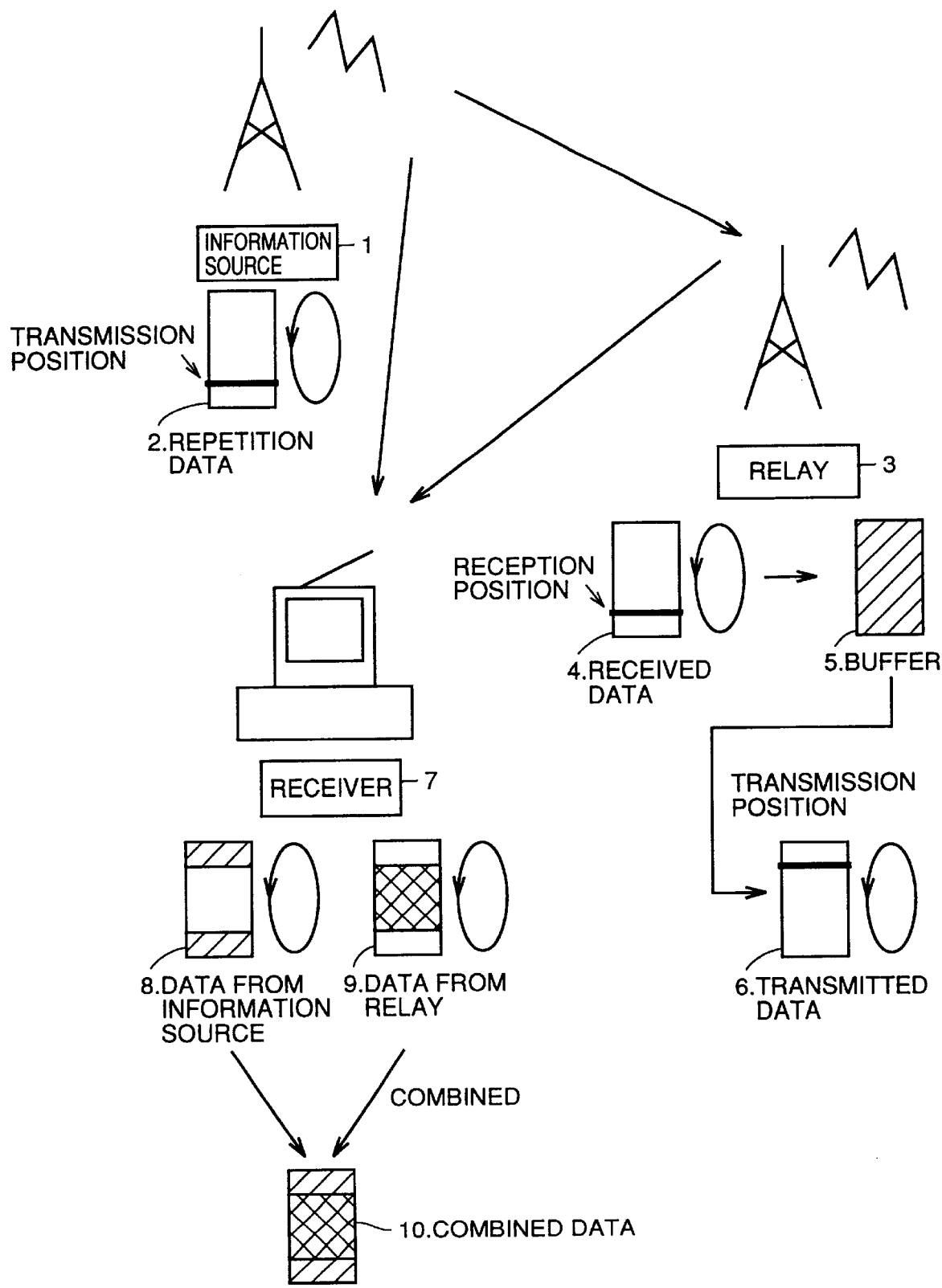
FIG. 25 is a schematic illustration showing a procedure of transmission according to a tenth embodiment of the invention.

A tenth embodiment of the invention will be described. FIG. 25 is a schematic representation showing the tenth embodiment. Referring to FIG. 25, in the embodiment, data is transmitted repeatedly from a single information source 1 directly or through a relay 3 to a receiver 7.

Referring to FIG. 25, the information is repeatedly transmitted from information source 1 to relay 3 and receiver 7. Relay 3 receives the information from information source 1 and transmits the received information to receiver 7. Receiver 7 can receive information from information source 1 and relay 3 at a time. Information source 1 repeatedly transmits data 2. Relay 3 receives repeated data 2 from information source 1 and labels the data as received data 4. The received data 4 is stored in a buffer 5 until at least one repetition completes. The data stored in buffer 5 is repeatedly transmitted as repeated transmission data 6, the position of transmission at the time is shifted from the position of reception. In this embodiment, the position is shifted by the half of the length of the data. Receiver 7 receives repeated data 2 from information 1 and repeated data 6 from relay 3 at a time. The former received data is labeled data 8 from the information source and the latter is labeled data 9 from the relay. Data 8 from information source and data 9 from relay 3 are combined to be combined data 10. Since these pieces of data are shifted from each other, the reception of the data completes when the entire data is collected in combined data 10. In this embodiment, since the half of the data length is shifted in relay 3, time required for receiving the data is half that of the case communicating only with information source 1. When receiver 7 is capable of communicating only with one of information source 1 and relay 3, the same repeated data can be obtained.

Eleventh Embodiment

Figure 26:
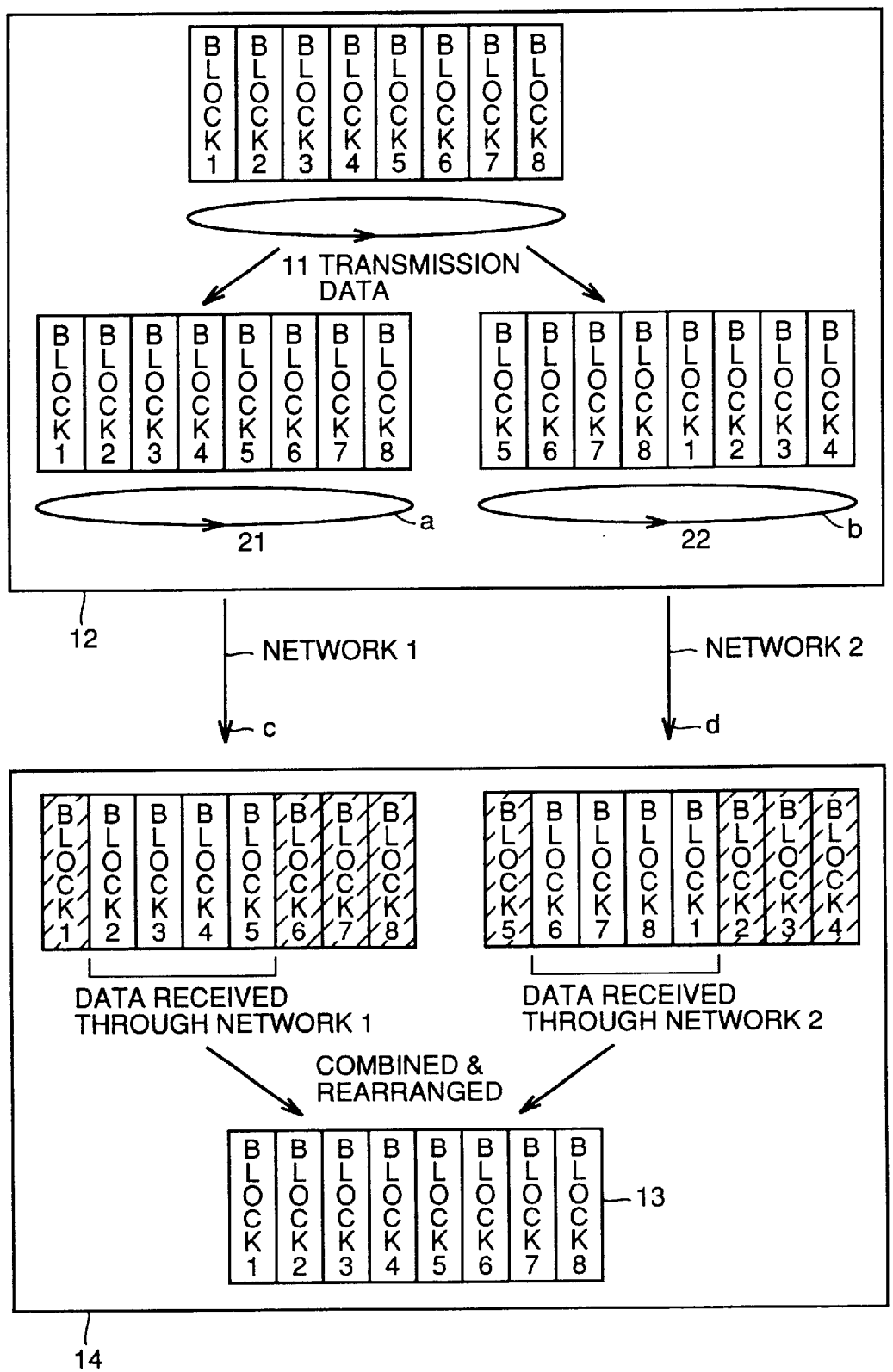
FIG. 26 is a schematic illustration showing a procedure of communication according to an eleventh embodiment of the invention.

An eleventh embodiment of the invention will be described. In this embodiment, single information is also transmitted to the receiving side through a plurality of routes as is the case with the foregoing embodiment. FIG. 26 is a schematic representation for use in illustration of the state of communication according to the eleventh embodiment. Referring to FIG. 26, information including blocks 1 to 8 is repeatedly transmitted to receiving side 14 using a network 1 and a network 2. The transmitting side transmits data using these two networks, the order of transmitting through network 1 goes from block 1 to block 8 indicated by a, and then block 1 is transmitted. Meanwhile, in transmission through network 2, as indicated by b, block 5 is transmitted as network 11 transmits block 1, followed by block 6, block 7, block 8, block 1, block 2, block 3, and block 4 and again block 5 as network 11 transmits block 2, block 3, block 4, block 5, block 6, block 7, block 8 and block 1, respectively, in other words all the data blocks are transmitted shifted by half of the whole blocks constituting transmission data.

The receiving side receives data through networks 1 and 2 simultaneously, and the reception completes when information formed by combining information c from network 1 and information d from network 2 corresponds to all the data blocks.

In the example shown in FIG. 26, when data blocks 2, 3, 4 and 5 from network 1 are received, blocks 6, 7, 8 and 1 are received from network 2, and information including all the data blocks from blocks 1 to 8 can be obtained when the information from both networks are combined and rearranged in the order of blocks. Therefore, the time required for telecommunication is reduced by half as compared to the case of communicating through a single network. All the data blocks can be obtained even if communication is possible only with one of networks 1 and 2.

Twelfth Embodiment

Figure 27:
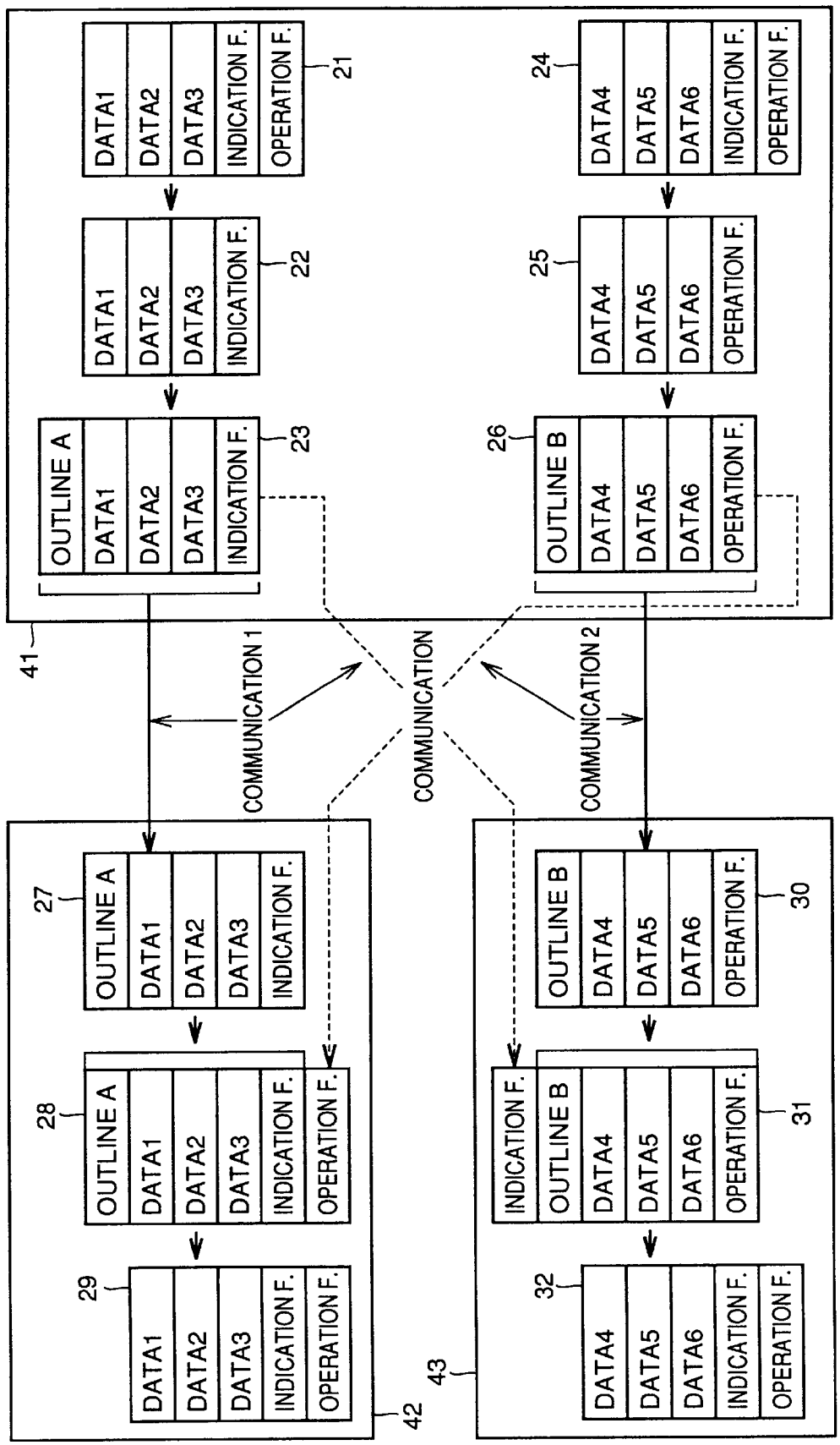
FIG. 27 is a schematic illustration showing a procedure of communication according to a twelfth embodiment of the invention.

A twelfth embodiment of the invention will be described. FIG. 27 is a schematic representation for use in illustration of the twelfth embodiment. This embodiment relates to a telecommunication method permitting efficient transmission of a plurality of pieces of source data which partly overlaps each other to a plurality of receiving sides.

Referring to FIG. 27, assume that first source data 21 and second source data 24 are transmitted to a first receiving side 42 and a second receiving side 43, respectively through communication 1 and communication 2 from a transmitting side 41. The overlapped portion between first source data 21 and second source data 24 is deleted. In this case, since the indication function and operation function are the same between these pieces of data, first source data 21 is removed of the operation function and formed into first transmitting adjusted data 22. Meanwhile, second source data 24 is removed of the indication function and formed into second transmitting adjusted data 25. These pieces of data are attached with data A and B indicating the outlines. In this example, first transmitting adjusted data 22 is attached with outline A and formed into first transmitting data 23, and second transmitting adjusted data 25 is attached with outline B and formed into second transmitting data 26. Outline A includes the content of transmission through communication 1, the content of transmission through communication 2 and contents necessary for implementing the function of communication 1 and its order. It is described to refer to the necessary content if the contents of transmission through communication 1 does not includes the necessary content (which corresponds to the operation function in this embodiment). Outline B includes the content of transmission through communication 2, the content of transmission through communication 1 and contents necessary for implementing the function of communication 2 and its order. It is described to refer to the necessary content of communication 1 and its order if the content of transmission through communication 2 does not include a necessary content (which corresponds to the indication function in this embodiment). Thus, the content to transmit is completed. Communication 1 repeatedly transmits first transmitting data 23, while communication 2 repeatedly transmits second transmitting data 26. The contents of outlines A and B are shown in FIGS. 28A and 28B.

First receiving side 42 receives data by the following procedure. First transmitting data 23 is received through communication 1 and formed into first received data 27. Then, referring to outline A, it is recognized that there is data (operation function) lacking in first received data 27. The receiving side determines to refer to communication 2 and communicates with communication 2, and then obtains the lacking data (operation function). The lacking data (operation function) is then added to first received data 27, which is labeled first received added data 28. Then, the order of necessary contents in outline A is referred to, first received added data 28 is rearranged to produce first received final data 29 by removing outline A and the receiving operation completes.

Similarly, second receiving side 43 receives data by the following procedure. Second transmitting data 26 is received through communication 2 and formed into second received data 30. Then, referring to outline B, the receiving side recognizes that there is data (indication function) lacking in the second received data, and determines to refer to communication 1. The receiving side communicates with communication 1, obtains the lacking data (indication function), then adds the lacking data (indication function) to the second received data, and the data is formed into second received added data 31. Then, referring to the order of necessary contents in outline B, second received added data 31 is rearranged, second received final data 32 is produced by removing outline B, and the receiving operation completes.

Through the above-described processings, it is no longer necessary for communication 1 and communication 2 to transmit overlapping data, and the communication efficiency increases.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A telecommunication method, wherein the same information is repeatedly transmitted from a single information source on a transmitting side to an information device on a receiving side that includes a reception memory for storing the entire information, the method comprising the steps of:

dividing the entire information into first through last data blocks on the transmitting side;

repeatedly transmitting in order said first through last data blocks produced by dividing based on a predetermined procedure;

starting, on the receiving side, an operation in which the transmitted data blocks are received and stored block-by-block in said reception memory, wherein the operation starts when any one of said transmitted first through last data blocks is received on the receiving side, even if the received data block is not the first data block; and ending the operation when all of said transmitted data blocks have been received and stored in said reception memory, whereby the entire information is obtained on the receiving side.

2. The telecommunication method as recited in claim 1, further comprising a step of specifying said data blocks produced by dividing.

3. The telecommunication method as recited in claim 2, wherein said step of specifying said data blocks includes a step of adding information to said data blocks, said information indicating the position of storing said data block received by the receiving side.

4. The telecommunication method as recited in claim 2, wherein said step of specifying said data blocks includes a step of adding information indicating the order of transmitting said data blocks on said transmitting side, and received data blocks are positioned based on the information indicating said order of transmission on said receiving side.

5. The telecommunication method as recited in claim 2, wherein said step of specifying said data blocks includes a step of forming part of the information of said data blocks into identifiers for said data blocks on said transmitting side, and the information is restored using said identifiers on said receiving side.

6. The telecommunication method as recited in claim 1, further comprising the steps of:

updating information;

transmitting information indicating said update information from said transmitting side; and receiving data once again if said update information is determined on said receiving side.

7. The telecommunication method as recited in claim 6, wherein said step of transmitting the information indicating said update information includes a step of adding update information to each of said data blocks.

8. The telecommunication method as recited in claim 7, further comprising the steps of producing contents after updating and the contents of a change between before and after the updating for each said data block on said transmitting side, and transmitting the produced contents after updating and of the change for a prescribed time period after the updating, said receiving side receiving information using the contents after the updating and the contents of the change transmitted.

9. The telecommunication method as recited in claim 6, wherein the information indicating said update information includes information indicating whether or not information received before updating can be used, and the information before updating is also used if the information before updating can be used based on said update information.

10. The telecommunication method as recited in claim 9, further comprising transmitting said information indicating said update information at a predetermined time after said updating.

11. The telecommunication method as recited in claim 9, wherein information before updating is obtained from data received before said updating and data received after said updating.

12. The telecommunication method as recited in claim 1, wherein a plurality of communication media are provided from said transmitting side to said receiving side, said plurality of communication media transmitting said information by shifting the positions of transmitting blocks from each other, and said receiving side receives said information simultaneously from said plurality of communication media, and arranges unoverlapped portions of the received content, thereby obtaining the entire said information.

13. The telecommunication method as recited in claim 12, wherein said plurality of communication media includes a plurality of communication networks, which communicate data interpolated with each other.

14. The telecommunication method as recited in claim 1, wherein communication is unilateral from said transmitting side to said receiving side.

15. A telecommunication method through which at least two pieces of transmission information are transmitted from a plurality of transmitters on a transmitting side to at least two receivers on a receiving side, wherein said transmission information includes an overlapped portion of the same data content, the method comprising:

at least one of said transmitters on said transmitting side removing said overlapped portion of the information from one of the pieces of the information, said receiving side receiving information from the plurality of transmitters, and receiving desired information based on said plurality of pieces of information.

16. The telecommunication method as recited in claim 15, wherein said transmitting side transmits information indicating that said overlapped portion of the information is removed, and said receiving side restores said desired information based on the information received from said plurality of transmitters on said transmitting side upon receiving said information associated with the removal.

17. A telecommunication method, comprising the steps of:

on a transmitting side, dividing data into first through last data blocks, and repeatedly transmitting in order the first through last data blocks; and on a receiving side, determining the start of any one of the first through last data blocks, starting an operation in which said transmitted data blocks are received and stored block-by-block in a reception memory for storing all of the data, wherein the operation starts with the block whose start has been determined even if the block whose start has been determined is not the first data block, and ending the operation when all of said transmitted data blocks have been received and stored in said reception memory, whereby all of the data is obtained on the receiving side.

18. The communication method as recited in claim 17, further comprising the step of:

on the receiving side, rearranging the received and stored data blocks with reference to the position of the first data block.

19. The communication method as recited in claim 17, comprising the further steps of:

on the transmitting side, providing address data for the data blocks and transmitting the address data, and on the receiving side, receiving the address data, wherein the data blocks are stored in accordance with the received address data.

20. The communication method as recited in claim 17, comprising the further steps of:

on the transmitting side, providing transmission order data for the data blocks and transmitting the transmission order data, and on the receiving side, receiving the transmission order data, wherein the data blocks are stored in accordance with the received transmission order data.

21. The communication method as recited in claim 17, comprising the further steps of:

on the transmitting side, providing block identifier data for the data blocks and transmitting the block identifier data, and on the receiving side, receiving the block identifier data, wherein the data blocks are stored in accordance with the received block identifier data.

22. The communication method as recited in claim 17, comprising the further steps of:

on the transmitting side, updating the data by updating one or more data blocks, providing version data indicating the version of the updated data, and transmitting the updated data blocks and the version data, and on the receiving side, receiving the version data, using the received version data to determine whether the data has been updated, and, if so, clearing any stored memory blocks, determining again the start of any one of the first through last data blocks and receiving and storing all of the data blocks beginning with the block whose start has now been determined.

23. The communication method as recited in claim 17, wherein a plurality of communication media are provided on the transmitting side for communicating the data blocks, the data blocks transmitted by a first of said communication media being shifted relative to the data blocks transmitted by a second of said communication media.

24. The communication method as recited in claim 23, wherein the shift is half of the length of the data.

25. The communication method as recited in claim 17, wherein when the data comprises document data, the document data is divided into blocks on a sentence-by-sentence basis; when the data comprises program data, the program data is divided into blocks on a subroutine-by-subroutine basis; and when the data comprises application data, the application data is divided into blocks on a function-by-function basis.

26. The communication method as recited in claim 17, wherein a signal is inserted in the data indicating the first or last data block so that the last data block can be determined.

27. The telecommunication method as recited in claim 17, wherein communication is unilateral from said transmitting side to said receiving side.

* * * * *